United States Patent
Williams et al.

(10) Patent No.: US 10,359,808 B1
(45) Date of Patent: Jul. 23, 2019

(54) APPARATUS, SYSTEM, AND CLUSTER FOR VERTICALLY DOCKING INTERACTIVE DEVICES

(71) Applicant: QuirkLogic, Inc., Calgary (CA)

(72) Inventors: Patrick Douglas Henry Williams, Ottawa (CA); James Patrick Henderson, Gatineau (CA); Duncan James Gibbons, Ottawa (CA); Matthew Thomas Robert Bailey, Ottawa (CA); Tian Zhao, Ottawa (CA); Alfonso Fabian de la Fuente, Victoria (CA)

(73) Assignee: Quirklogic, Inc., Calgary (CA)

( * ) Notice: Subject to any disclaimer, the term of this patent is extended or adjusted under 35 U.S.C. 154(b) by 0 days.

(21) Appl. No.: 15/940,833

(22) Filed: Mar. 29, 2018

Related U.S. Application Data

(63) Continuation of application No. 15/393,910, filed on Dec. 29, 2016, now Pat. No. 9,958,905.

(51) Int. Cl.
| | | |
|---|---|---|
| *G06F 1/16* | (2006.01) | |
| *B60R 11/02* | (2006.01) | |
| *F16M 11/04* | (2006.01) | |
| *F16M 13/02* | (2006.01) | |

(52) U.S. Cl.
CPC .......... *G06F 1/1632* (2013.01); *G06F 1/1679* (2013.01); *G06F 1/1683* (2013.01); *B60R 11/0252* (2013.01); *F16M 11/041* (2013.01); *F16M 13/02* (2013.01)

(58) Field of Classification Search
CPC ..... G06F 1/1632; G06F 1/162; F16M 11/041; F16M 13/02; F16B 1/00; Y10T 70/5009; Y10T 24/32; B60R 11/0252; B60R 2011/0075; Y10S 211/01
See application file for complete search history.

(56) References Cited

U.S. PATENT DOCUMENTS

| | | | | |
|---|---|---|---|---|
| 7,236,863 B2 * | 6/2007 | LaPorte | .............. | B60R 11/0252 361/679.41 |
| 7,606,026 B2 * | 10/2009 | Quijano | ............... | F16M 11/041 361/679.57 |
| 8,245,992 B2 * | 8/2012 | Matsui | .................... | F16M 13/02 248/224.51 |
| 8,424,825 B2 | 4/2013 | Somuah | | |
| 8,469,077 B1 * | 6/2013 | Allard | ................. | E04F 10/0603 160/24 |
| 8,867,202 B2 * | 10/2014 | Williams | .............. | G06F 1/1632 361/679.41 |
| 8,873,233 B2 * | 10/2014 | Reber | ..................... | H04M 1/04 361/679.01 |

(Continued)

*Primary Examiner* — Abhishek M Rathod
(74) *Attorney, Agent, or Firm* — Chamberlain, Hrdlicka, White, Williams & Aughtry

(57) ABSTRACT

A vertical docking apparatus (VDA) includes a back panel assembly with at least a first device docking hook (DDH) and a first panel mounting cavity. The first panel mounting cavity is located on a back surface of the back panel assembly and configured to allow the back panel assembly to be mounted to a vertical surface. Additionally, the VDA includes a front panel assembly that is attached to the back panel assembly, a first DDH cavity that is adapted to receive the first DDH, and a transmission connector.

7 Claims, 27 Drawing Sheets

(56) References Cited

U.S. PATENT DOCUMENTS

| | | | |
|---|---|---|---|
| 2005/0152102 A1* | 7/2005 | Shin | F16M 11/10 |
| | | | 361/679.29 |
| 2009/0027849 A1 | 1/2009 | Tanaka | |
| 2009/0213536 A1* | 8/2009 | Lewandowski | G06F 1/1632 |
| | | | 361/679.43 |
| 2010/0118485 A1 | 5/2010 | Crooijmans et al. | |
| 2012/0025035 A1* | 2/2012 | Huang | F16M 11/041 |
| | | | 248/122.1 |
| 2013/0050932 A1 | 2/2013 | Williams | |
| 2013/0301216 A1 | 11/2013 | Trinh et al. | |
| 2015/0246645 A1 | 9/2015 | Procter et al. | |
| 2016/0138754 A1* | 5/2016 | Li | F16M 13/022 |
| | | | 248/206.5 |

* cited by examiner

APPARATUS, SYSTEM, AND CLUSTER FOR VERTICALLY DOCKING INTERACTIVE DEVICES

CROSS-REFERENCE TO RELATED APPLICATIONS

This application is a continuation application of U.S. patent application Ser. No. 15/393,910, filed on Dec. 29, 2016, and entitled: "AN APPARATUS, SYSTEM, AND CLUSTER FOR VERTICALLY DOCKING INTERACTIVE DEVICES" Accordingly, this application claims benefit of U.S. patent application Ser. No. 15/393,910 under 35 U.S.C. § 120. U.S. patent application Ser. No. 15/393,910 is here by incorporated by reference in its entirety.

BACKGROUND

Docking stations have long since been introduced as accessories for, and configured to replicate peripherals to, portable computers. Most docking stations, however, couple with portable computers as both are horizontally-positioned. On the other hand, mounting brackets provide vertical, however, permanent docking. A hybrid docking mechanism wherein an interactive device may be temporarily mounted vertically and wherein peripherals may be replicated is desired.

SUMMARY

In general, in one aspect, the invention relates to a vertical docking system (VDS). The VDS includes a vertical docking apparatus (VDA). The VDA includes a back panel assembly including a back panel and at least one device docking hook (DDH), and a front panel assembly including a front panel and a transmission connector, wherein the front panel is oppositely disposed and operatively connected to the back panel, wherein the transmission connector includes a first set of pins operatively connected to a power conversion module, and wherein the at least one DDH extends frontally from the back panel and through the front panel.

In general, in one aspect, the invention relates to a system. The system includes an interactive device, and a vertical docking system (VDS). The VDS includes a vertical docking apparatus (VDA). The VDA includes a back panel assembly including a back panel and at least one device docking hook (DDH), and a front panel assembly including a front panel and a transmission connector, wherein the front panel is oppositely disposed and operatively connected to the back panel, wherein the transmission connector includes a first set of pins operatively connected to a power conversion module, and wherein the at least one DDH extends frontally from the back panel and through the front panel, and couples to the interactive device.

Other aspects of the invention will be apparent from the following description and the appended claims.

DETAILED DESCRIPTION

Figure 1A:
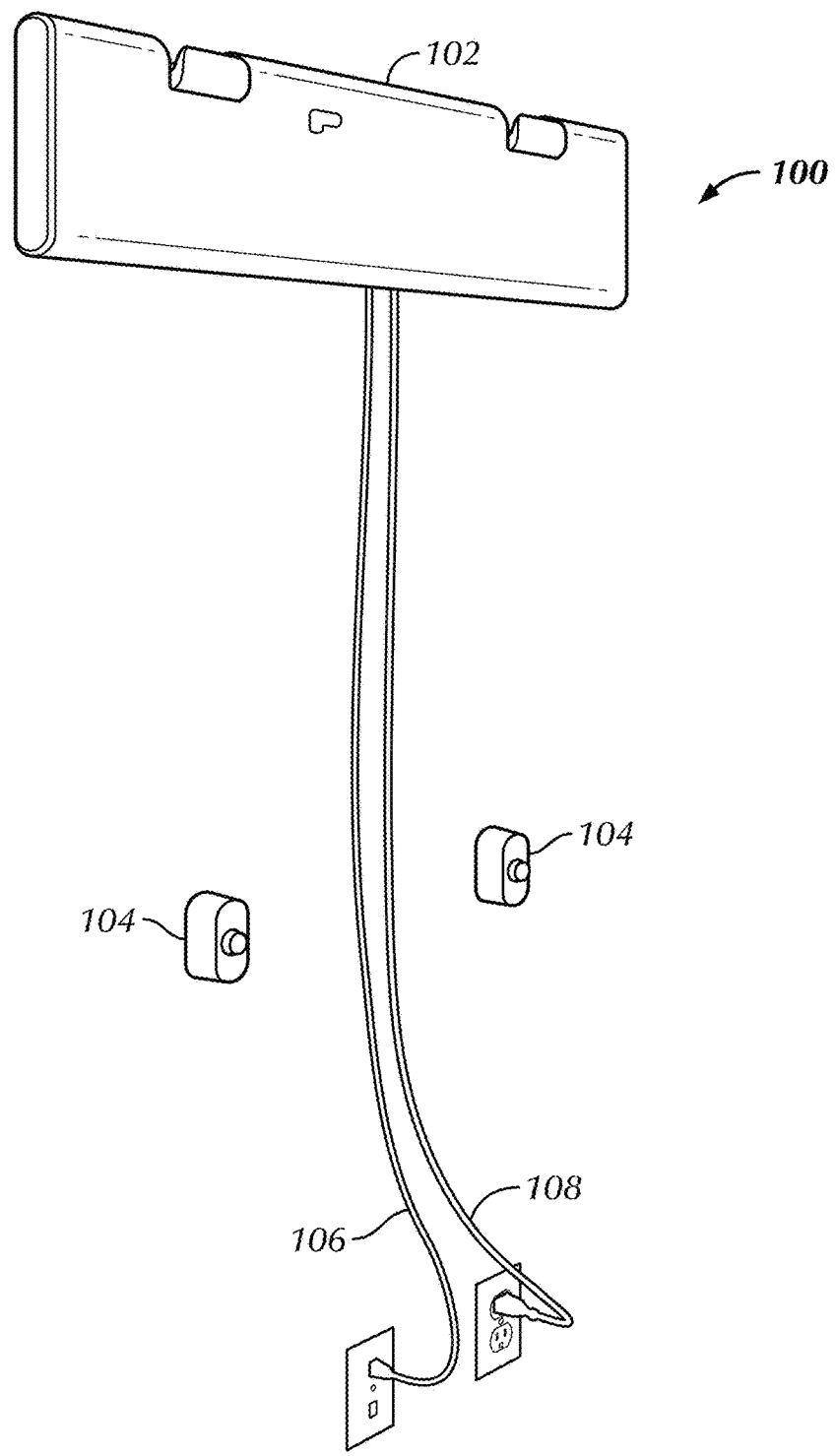
FIG. 1A shows a vertical docking system (VDS) in accordance with one or more embodiments of the invention.

Specific embodiments of the invention will now be described in detail with reference to the accompanying figures. Like elements in the various figures are denoted by like reference numerals for consistency. In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any elements to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1A-8G, any components described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components.

Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

In general, embodiments of the invention relate to an apparatus, system, and cluster for vertically docking interactive devices. In one or more embodiments of the invention, the apparatus includes a pair of device docking hooks (DDHs), which temporarily couple to and secure an interactive device onto a vertical surface. In one or more embodiments of the invention, in addition to the apparatus, the system may include one or more device locking mount(s) (DLMs) coupled to the interactive device, which further secures the interactive device to a static vertical surface. The coupling between each of the one or more DLM(s) and the interactive device may take the form of, for example, a magnetic attachment, a hook and loop fabric attachment, a spring loaded hook, a simple gravity induced friction attachment (e.g., a resting pad), etc. Alternatively, in one or more other embodiments of the invention, in addition to the apparatus, the system may include a device locking apparatus (DLA), which when engaged may further secure the interactive device to an articulating vertical surface. In one or more embodiments of the invention, the cluster includes multiple apparatuses from which multiple interactive devices are hung adjacently on a common vertical surface.

FIG. 1A shows a vertical docking system (VDS) in accordance with one or more embodiments of the invention. The VDS (100) includes a vertical docking apparatus (VDA) (102) and a pair of device locking mounts (DLMs). Each of these components is described below.

In one or more embodiments of the invention, the VDA (102) may be a physical device from which an interactive device is hung. The VDA (102) may include functionality to facilitate the placement of the interactive device on a vertical surface (e.g., a wall, a whiteboard, a mounting bracket, etc.). The VDA (102) may include further functionality to replicate and thus relay alternating current (AC) and/or direct current (DC) power, as well as network connectivity, to the interactive device. In one or more embodiments of the invention, the VDA (102) may further provide, through a visual indication to a user, the status of the aforementioned power and network connectivity utilities. Additional details regarding the VDA (102) are described below with respect to FIGS. 2A-2E.

In one or more embodiments of the invention, a DLM (110) may be a physical device for securing the interactive device (further to the VDA (102)) onto a vertical surface. The DLMs (110) may further serve as spacers between the vertical surface and the interactive device, thereby preventing the interactive device from damaging the vertical surface, or vice versa. In one or more embodiments of the invention, the DLMs (110) may include additional functionality to align or position the interactive device so that the interactive device is parallel to the vertical surface. Additional details regarding the DLMs (110) are described below with respect to FIG. 3.

In one or more embodiments of the invention, the VDS (100) may further include a network connectivity cable (106) operatively connecting the VDA (102) to a network connectivity receptacle (not shown). The network connectivity cable (106) may be networking hardware that includes functionality to interconnect the VDA (102) to other VDAs (see e.g., FIG. 4A) and/or a local area network (LAN) or a wide area network (WAN), such as the Internet. The network connectivity cable (106) may facilitate the exchange of information or data between the devices it interconnects. Examples of a network connectivity cable (106) include, but are not limited to, a twisted pair cable (e.g., a category 5 (or Cat 5) cable, an Ethernet cable, etc.), an optical fiber cable, and a coaxial cable.

In one or more embodiments of the invention, the VDS (100) may additionally include an alternating current (AC) power cable (108) operatively connecting the VDA (102) to an AC power receptacle (not shown). The AC power cable (108) may be an assembly of one or more electrical conductors that includes functionality to propagate electrical power. The AC power cable (108) may facilitate the supply (or transmission) of electrical power from a power source (e.g., an AC power receptacle) to the VDA (102).

While FIG. 1A shows a configuration of components, VDS configurations other than that shown in FIG. 1A may be used without departing from the scope of the invention. For example, a VDS may alternatively include other components in place of the pair of DLMs (see e.g., FIGS. 8A and 8B).

Figure 1B:
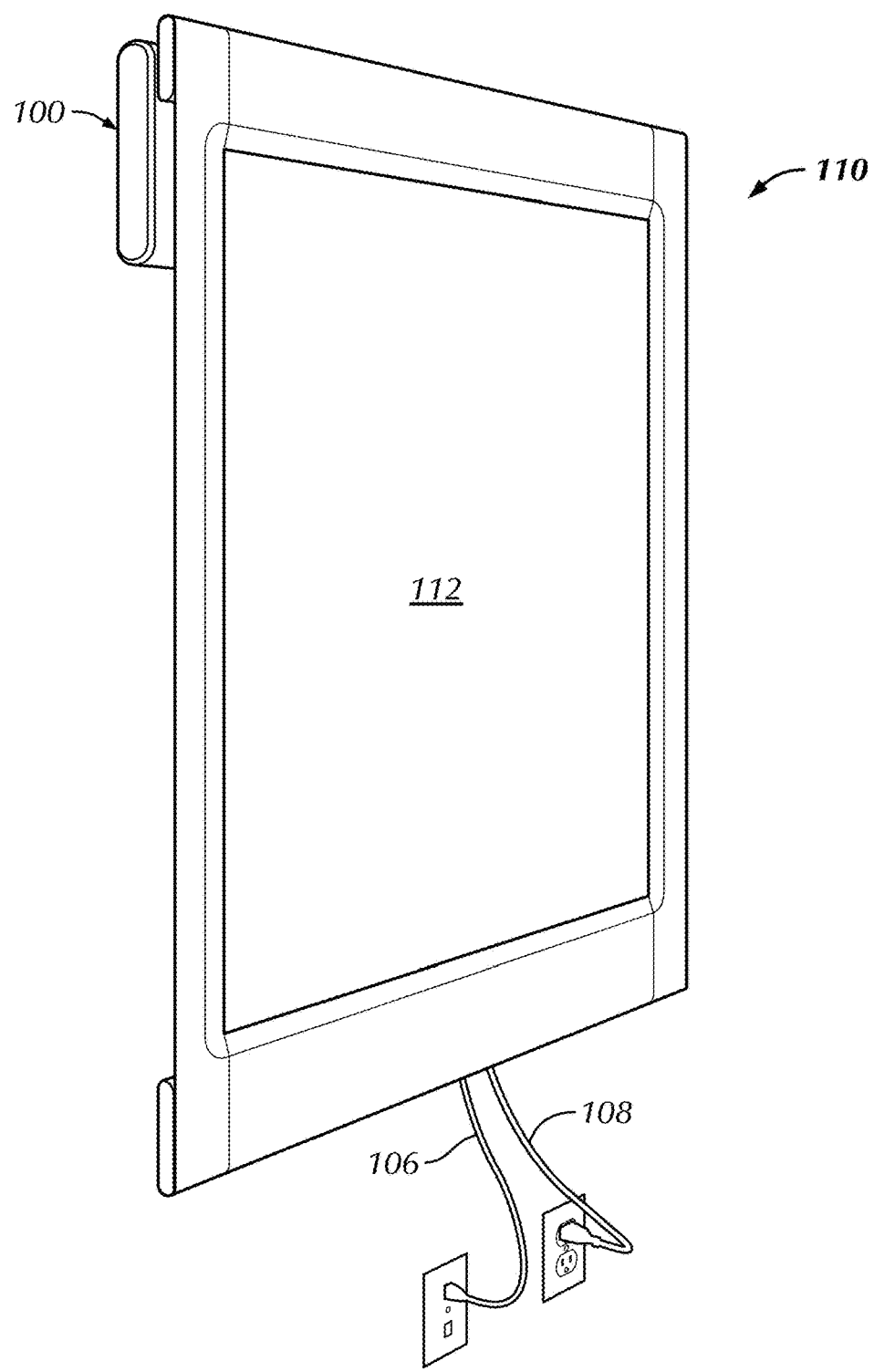
FIG. 1B shows a system in accordance with one or more embodiments of the invention.

FIG. 1B shows a system in accordance with one or more embodiments of the invention. The system (110) includes a vertical docking system (VDS) (100) operatively connected to an interactive device (112). The VDS (100) has been described above, and therefore, the interactive device (112) is described below.

In one or more embodiments of the invention, the interactive device (112) may be any physical system incorporating at least an interactive display, a processor, local persistent storage, and volatile memory. Examples an interactive device (112) include, but are not limited to, a reflective display device, an interactive whiteboard, an electronic tablet, an e-flipchart apparatus, or any other interactive device capable of receiving input.

In one or more embodiments of the invention, the interactive display (not shown) may be a user interface with a display screen. The display screen may be a reflective liquid crystal display (LCD), a bi-stable or electrophoretic display (e.g., electronic paper and/or electronic ink displays), an electrochromic display, electro-wetting or electro-fluidic display, an interferometric modulated display (e.g., a technology that creates color via the interference of reflected light), and an electromechanical modulated display (e.g., a video projector, a flap display, a flip disk display, a digital micro-mirror device (DMD), an interferometric modulator display (IMOD), an uni-pixel display (FTIR), and a telescopic pixel display).

In one or more embodiments of the invention, volatile memory (not shown) may be any volatile memory including, but not limited to, dynamic random access memory (DRAM), synchronous DRAM (SDRAM), single data rate (SDR) SDRAM, and double data rate (DDR) SDRAM. In one or more embodiments of the invention, local persistent storage (not shown) may be, for example, solid state memory, optical storage, magnetic storage, or any other medium capable of persistently storing data.

Figure 1D:
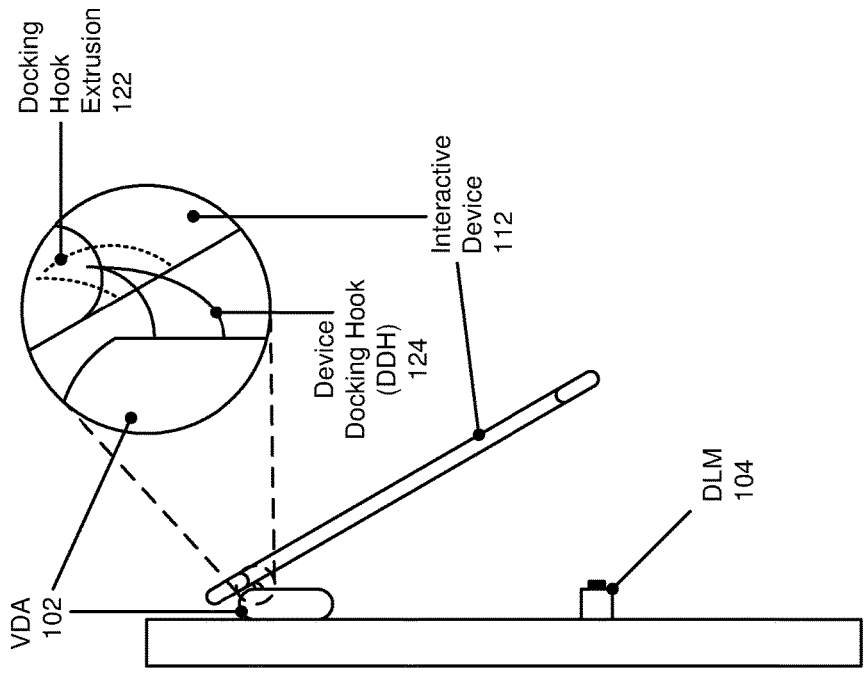
FIGS. 1C-1F show diagrams illustrating the docking of an interactive device in accordance with one or more embodiments of the invention.
Figure 1C:
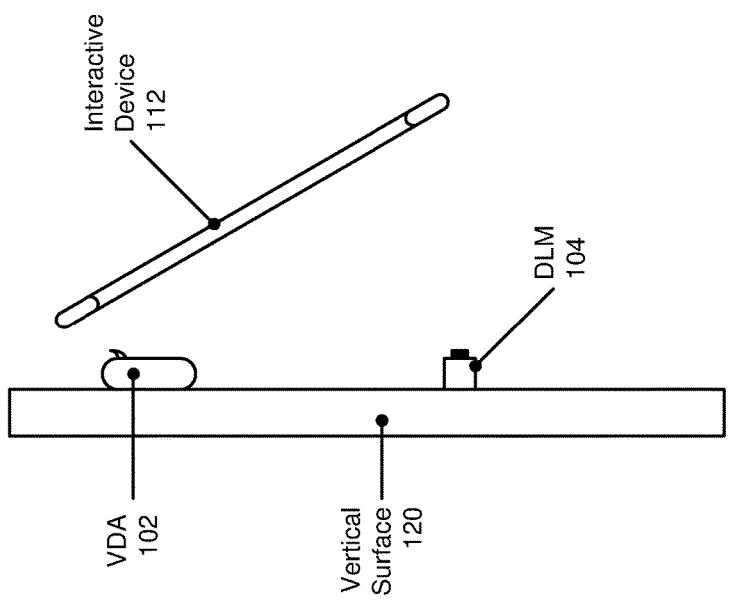

FIGS. 1C-1F show diagrams illustrating the docking of an interactive device in accordance with one or more embodiments of the invention. Turning to FIG. 1C, prior to the docking of the interactive device (112), the VDA (102) and DLMs (104) are shown mounted onto a vertical surface (120). The VDA (102) and/or DLMs (104) may be mounted/installed onto the vertical surface (120) using, for example, nails, screws or any other forms of mechanical fasteners through their respective mounting cavities, high-strength bonding tape (e.g., VHB tape), etc.

Proceeding to FIG. 1D, when docking the interactive device (112) onto the VDA (102), a pair of device docking hooks (DDHs) (124) (extending frontally from the VDA (102)) are coupled to docking hook extrusions (122) on the backside of the interactive device (112). These docking hook extrusions (122) may be situated at multiple locations on the backside of the interactive device (112), thus permitting the interactive device (112) to dock at any orientation relative to the VDA (102).

Figure 1F:
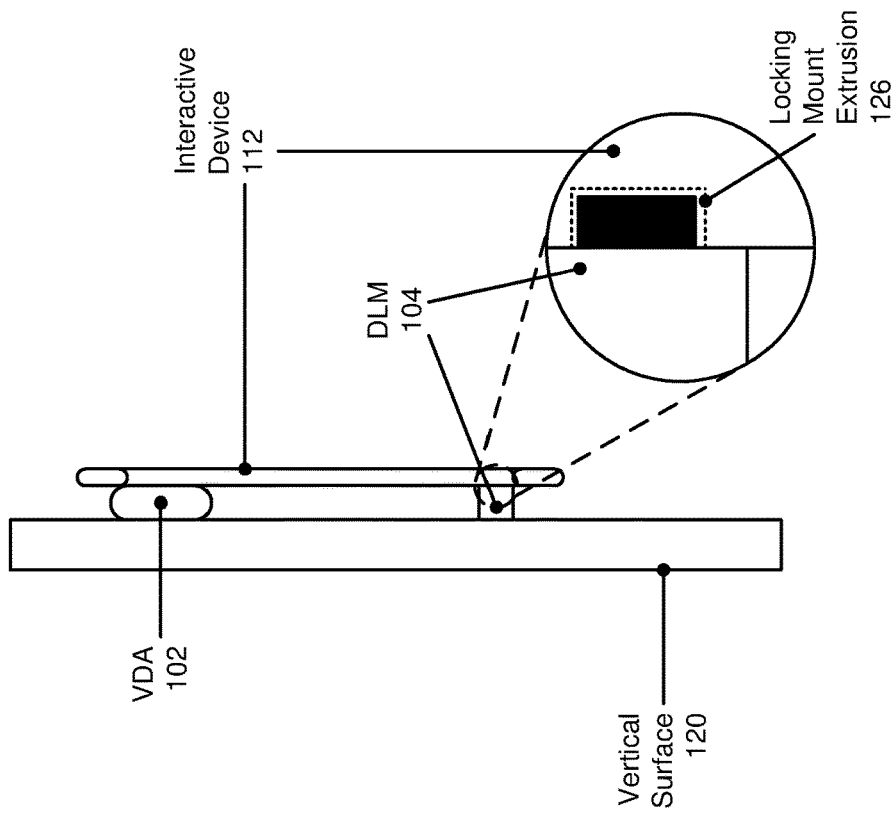
Figure 1E:
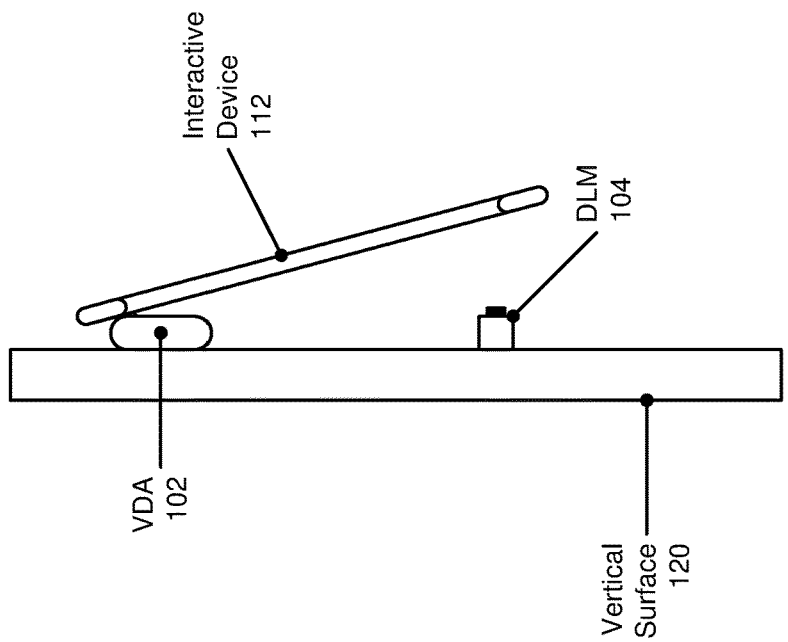

Turning to FIG. 1E, once the interactive device (112) is secured onto the VDA (102) via the pair of DDHs (124), the interactive device (112) may be lowered towards a more vertical position flush with the DLMs (104) and parallel with the vertical surface (120). FIG. 1F illustrates the docked interactive device (112) at its final position. In this final position, a portion of the DLMs (104) may couple to locking mount extrusions (126) at one of multiple locations on the backside of the interactive device (112), thus locking the interactive device (112) in place.

Figure 2A:
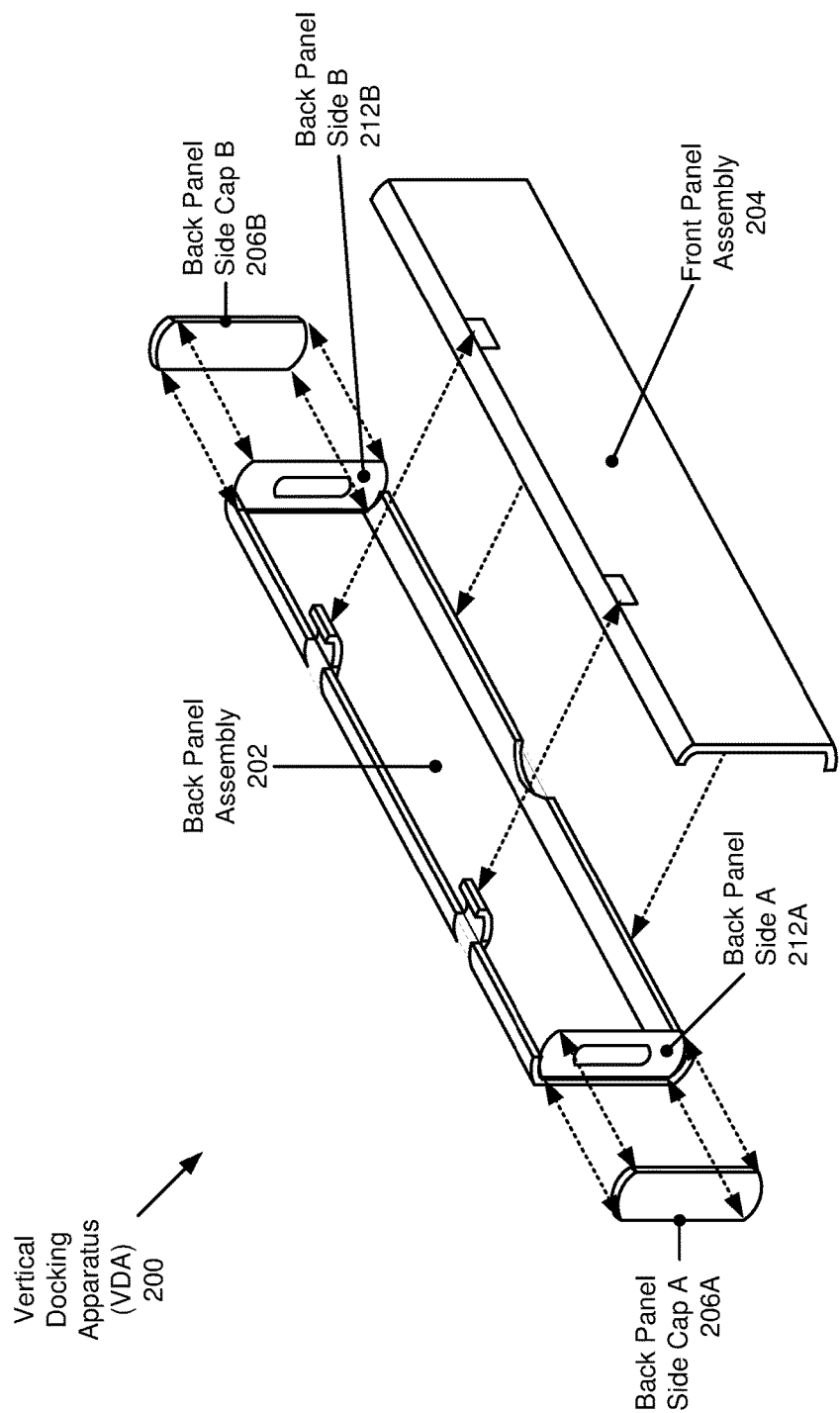
FIG. 2A shows a vertical docking apparatus (VDA) in accordance with one or more embodiments of the invention.

FIG. 2A shows a vertical docking apparatus (VDA) in accordance with one or more embodiments of the invention. The VDA (200) includes a back panel assembly (202) oppositely disposed and operatively connected to a front panel assembly (204). When fastened together, the back panel assembly (202) and the front panel assembly (204) form a hollow manifold/structure within which additional components (not shown) are housed and/or protected. The back panel assembly (202) and the front panel assembly (204) may be fastened together using one or more of any form of mechanical fastener (not shown) such as, for example, latches, magnets, clips, rivets, hinges, etc. In one or more embodiments of the invention, the back panel assembly (202), the front panel assembly (204), and/or a hinged portion (not shown) coupling the back panel assembly (202) and front panel assembly (204) together may be manufactured, collectively, as a single contiguous component (e.g., an injection molding operation would create the back panel assembly (202), the front panel assembly (204), and the hinged portion at one time as a single component/piece). In these one or more embodiments, the hinged portion (not shown) may be implemented as a living hinge, or a thin flexible hinge constructed of the same materials as the back panel assembly (202) and/or front panel assembly (204), or any other flexible and durable material, such as polypropylene, polyethylene, etc. In these one or more embodiments, the hinged portion may include functionality to enable the rotation of the front panel assembly (204), relative to the back panel assembly (202), about one axis up to (and/or exceeding) 180 degrees. The hinged portion may be designed to outlast repeated bending without failure.

In one or more embodiments of the invention, the VDA (200) further includes a pair of back panel side caps (206A, 206B), which may be fastened to the sides of the back panel assembly (202). These back panel side caps (206A, 206B) may serve to cover the exposed sides of the back panel assembly (202), particularly when cables do not traverse from one VDA (200) to another in a vertical docking cluster (VDC) (see e.g., FIGS. 4A and 4B). Each back panel side cap (206A, 206B) may be fastened to a respective side of the back panel assembly (202) using one or more of any form of mechanical fastener (not shown) such as those exemplified earlier.

While FIG. 2A shows a configuration of components, VDA configurations other than that shown in FIG. 2A may be used without departing from the scope of the invention. For example, though each back panel side (212A, 212B) is illustrated orthogonal (e.g., 90 degrees relative) to the back panel assembly (202) and/or the front panel assembly in FIG. 2A, the back panel sides (212A, 212B) may be positioned at any angle relative to either the back panel assembly (202) or the front panel assembly (204), or both.

Figure 2B:
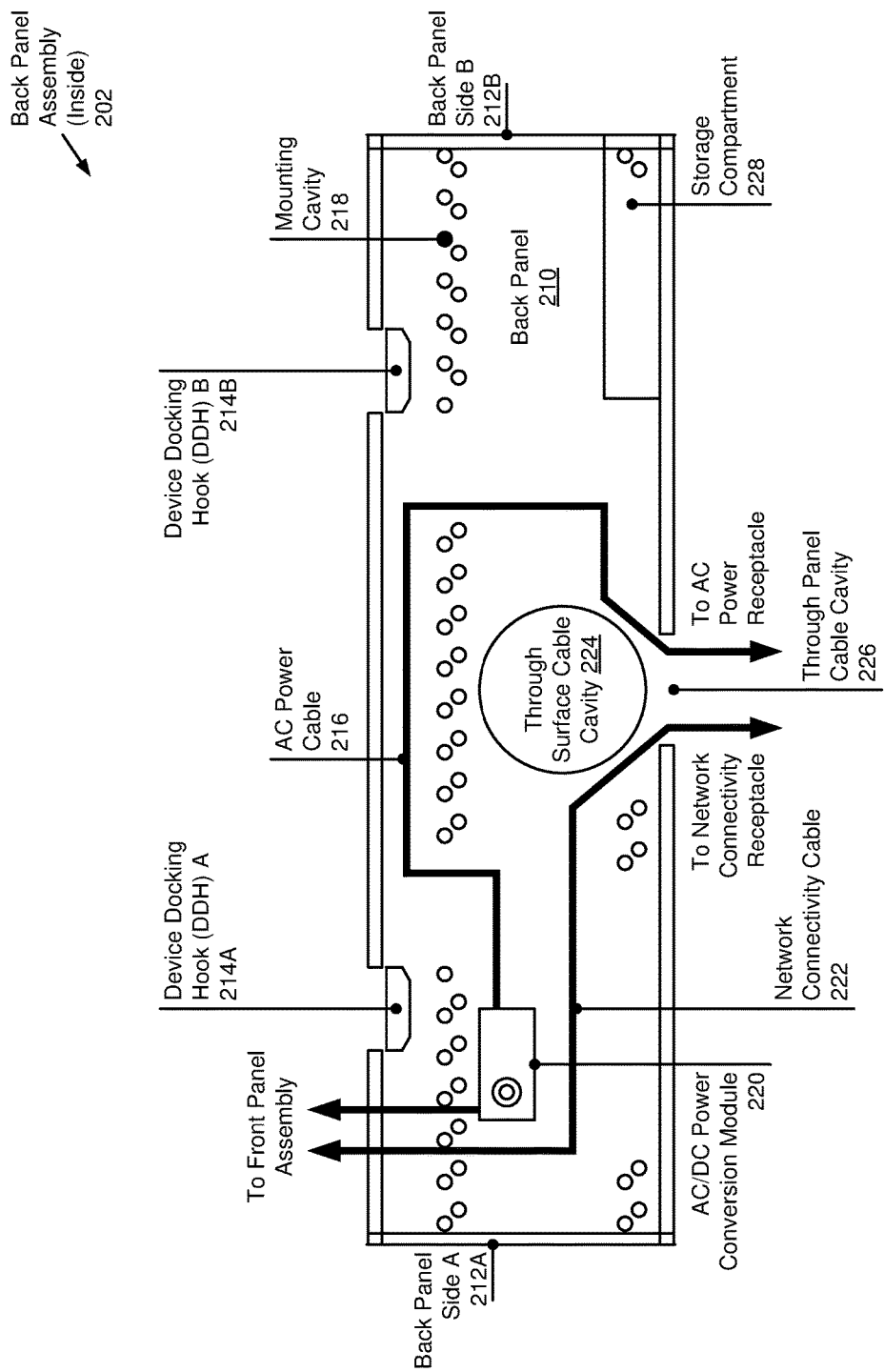
FIG. 2B shows a back panel assembly in accordance with one or more embodiments of the invention.

FIG. 2B shows a back panel assembly in accordance with one or more embodiments of the invention. Structurally, the back panel assembly (202) includes a back panel (210) and a pair of back panel sides (212A, 212B). Though introduced as two separate components, the back panel (210) and the pair of back panel sides (212A, 212B) may be manufactured as a single contiguous component. Moreover, each of the aforementioned components may be constructed of lightweight, rigid materials such as, for example, thermoplastics, aluminum, carbon fiber, composites, alloys, etc.

In one or more embodiments of the invention, the back panel assembly (202) further includes a pair of device docking hooks (DDHs) (214A, 214B) near the top of the back panel (210). The DDHs (214A, 214B) may extend frontally from the inside surface of the back panel (210) towards (and subsequently, through) the front panel assembly (204). When docking the interactive device, the DDHs (214A, 214B) are aligned with a pair of docking hook extrusions (see e.g., FIG. 1D) on the backside of the interactive device in order to couple the interactive device to the VDA. In one or more embodiments of the invention, the pair of DDHs (214A, 214B), the back panel (210), and the pair of back panel sides (212A, 212B) may be manufactured as a single contiguous component. In another embodiment of the invention, the pair of DDHs (214A, 214B) may be affixed/fastened to the inside surface of the back panel (210) via any form of mechanical fasteners and/or adhesives.

In one or more embodiments of the invention, the back panel assembly (202) further includes numerous mounting cavities (218) at strategic positions about the back panel (210). The availability of numerous mounting cavities (218) accommodate for the variety of distances separating, for example, wall studs, or more generally, any two or more vertical framing members supporting a vertical surface on which the VDA is to be mounted. The mounting cavities (218) facilitate the mounting of the VDA, either permanently or temporarily, onto a vertical surface via two or more of any form of mechanical fastener (e.g., nails, screws, bolts, hooks, magnets, etc.) and/or high strength tape (e.g., VHB tape, magnetic tape, etc.). In one or more embodiments of the invention, the DDHs (214A, 214B) may be removable and/or adjustable. Further, in one or more embodiments of the invention, the DDHs (214A, 214B) may be manufactured as a single contiguous component alongside the front panel assembly (204). In one or more other embodiments of the invention, the DDHs (214A, 214B) may be affixed or fastened to the inside (or outside) surface of the front panel assembly (204) via any form of mechanical fasteners and/or adhesives.

In one or more embodiments of the invention, the back panel assembly (202) further includes a through-wall cable cavity (224) situated at the center of the back panel (210). In scenarios where professional installation and/or cable management is involved, the through-surface cable cavity (224) may enable the various cables (e.g., the network connectivity cable (222), the AC power cable (216), etc.) to course within or behind the vertical surface between the VDA and utility/communication receptacles or mains, and/or between multiple VDAs within a VDC (see e.g., FIGS. 4A and 4B). In other scenarios, connections via cables (222, 216) from the VDA to network connectivity and/or AC power receptacles may traverse through a through-panel cable cavity (226) etched out from the bottom of the back panel (210).

In one or more embodiments of the invention, the back panel assembly (202) may further include an AC/DC power conversion module (220). The AC/DC power conversion module (220) may be affixed to the inside surface of the back panel (210), and thus lie interposed between the back panel assembly (202) and the front panel assembly (204). The AC/DC power conversion module (220) may include circuitry (e.g., rectifiers) for converting AC electrical power into DC electrical power. The AC/DC power conversion module (220) may also include circuitry (e.g., transformers, voltage dividers, voltage regulators, etc.) that step down or converts an input voltage (e.g., from the AC power receptacle) at a first voltage level to an output voltage at a second voltage level, which would be better suited for powering the interactive device and/or other components of the VDA (see e.g., FIG. 2C).

In one or more embodiments of the invention, the back panel assembly (202) may further include a storage compartment (228). The storage compartment (228) may be used to store and/or prevent loss of peripheral devices associated with the interactive device such as, for example, a stylus pen, a pointer mouse, a digital marker, adapters, etc. The storage compartment (228) may be used to store anything other than peripheral devices without departing from the scope of the invention.

While FIG. 2B shows a configuration of components, back panel assembly configurations other than that shown in FIG. 2B may be used without departing from the scope of the invention. For example, when VDCs are formed, which include two or more adjoined VDAs, the components may be rearranged and/or additional or alternative components may exist (see e.g., FIGS. 6A-7C). By way of another example, a VDA may include one DDH or alternatively, more than two DDHs.

Figure 2C:
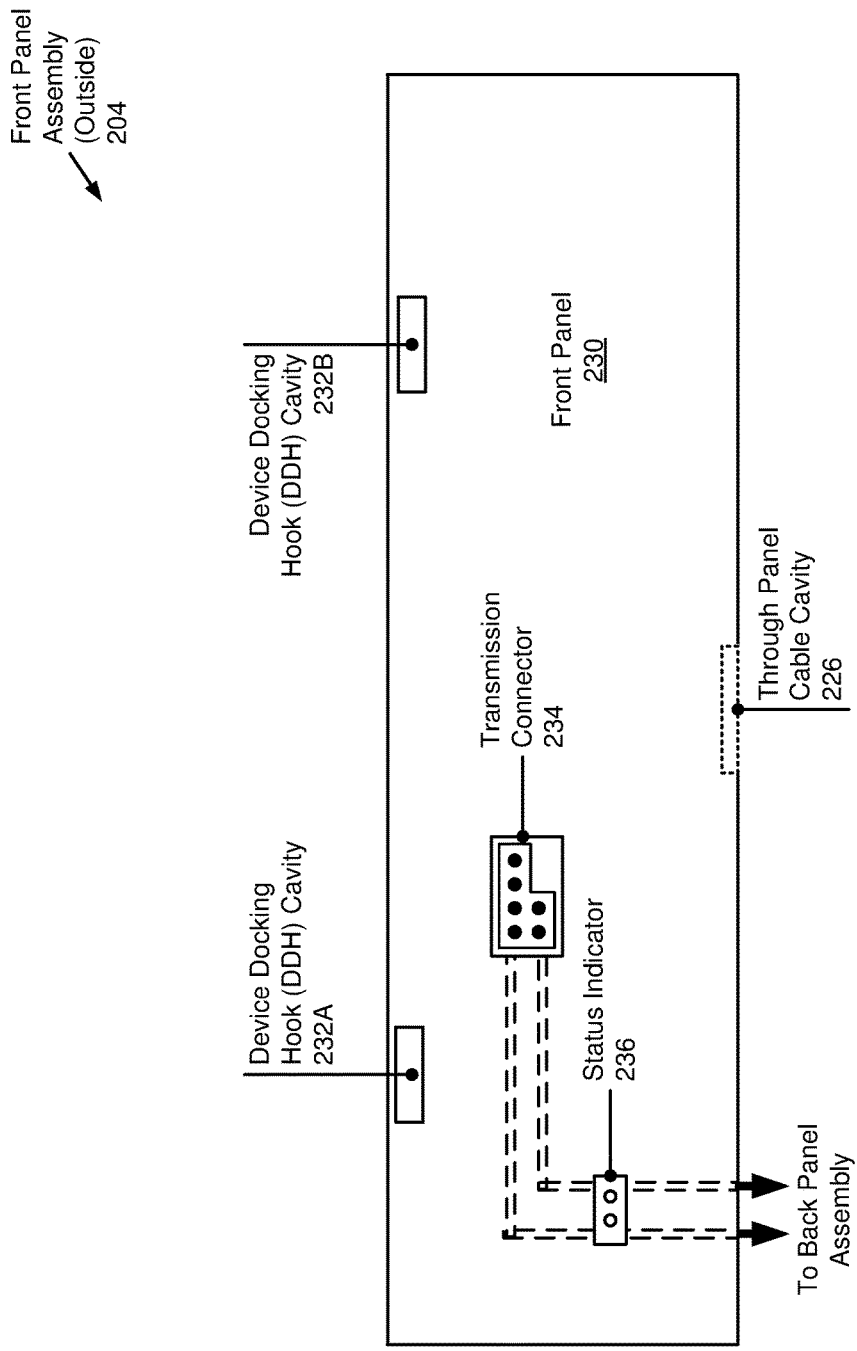
FIG. 2C shows a front panel assembly in accordance with one or more embodiments of the invention.

FIG. 2C shows a front panel assembly in accordance with one or more embodiments of the invention. The front panel assembly (204) includes a front panel (230) as the structural component. Similar to the back panel (210) of the back panel assembly (202), the front panel (230) may be constructed of lightweight, rigid materials such as, for example, thermoplastics, aluminum, carbon fiber, composites, alloys, etc. In alignment with the pair of DDHs (214A, 214B) of the back panel assembly (202), the front panel (230) includes a pair of device docking hook (DDH) cavities (232A, 232B) from which the pair of DDHs (214A, 214B) extend through to couple to the interactive device.

In one or more embodiments of the invention, the front panel assembly (204) may include a transmission connector (234). The transmission connector (234) may have a similar mating connector or receptacle on the backside of the interactive device to which the transmission connector (234) couples. The transmission connector (234) may be an assembly of two or more electrical conductors (i.e., pins, ports, sockets, terminals, interconnects, etc.) that facilitate the transmission of DC electrical power, networking data, and/or other signals or information (e.g., device identification information) to and from the interactive device.

In one or more embodiments of the invention, the front panel assembly (204) may further include a status indicator (236) affixed to the outside surface of, or protruding through, the front panel (230). In one or more embodiments of the invention, the status indicator (236) may be a digital display or an e-paper display. In another embodiment of the invention, the status indicator (236) may be one or more light emitting diodes (LEDs). Moreover, the status indicator (236) may be operatively connected to the transmission connector (234) and/or certain components of the back panel assembly (e.g., the network connectivity cable (222), the DC power output from the AC/DC power conversion module (220), etc.). Subsequently, the status indicator (236) includes functionality to, through visual indication, notify or inform a user of the status of the power cable and/or signals with which the status indicator (236) may be operatively connected. For example, the status indicator (236) may be operatively connected to the network connectivity cable (222), and thus, visually present the status of the network connection with which the interactive device is connected to a local area network (LAN) and/or a wide area network (WAN), such as the Internet.

While FIG. 2C shows a configuration of components, front panel assembly configurations other than that shown in FIG. 2C may be used without departing from the scope of the invention. For example, the transmission connector (234), similar to the pair of DDHs (214A, 214B) may be affixed to the inside surface of the back panel (210) and subsequently extend frontally and through a connector cavity (or slot) on the front panel (230).

Figure 2D:
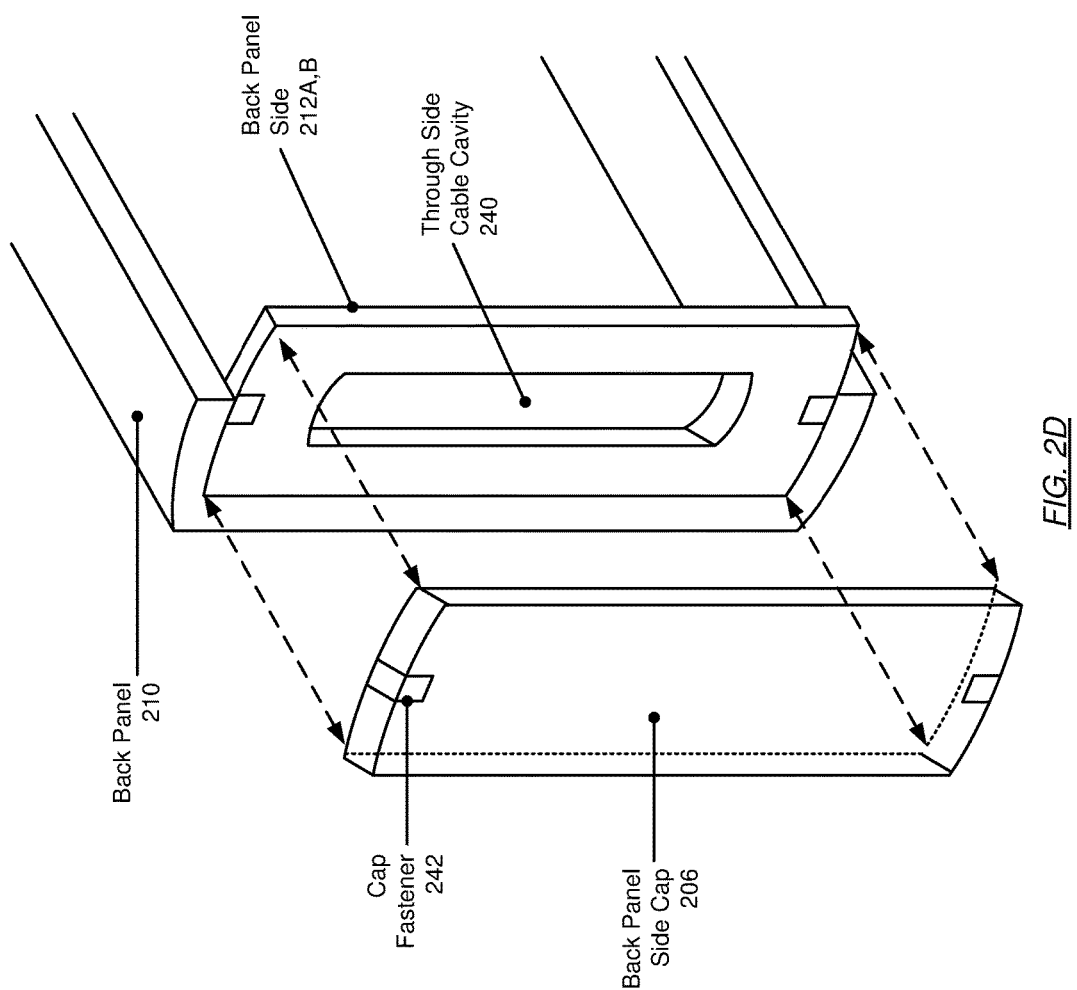
FIG. 2D shows the fastening of a back panel side cap to a back panel side in accordance with one or more embodiments of the invention.

FIG. 2D shows the fastening of a back panel side cap to a back panel side in accordance with one or more embodiments of the invention. As discussed above, in one or more embodiments of the invention, a back panel side (212A, 212B) may be a single contiguous component alongside the back panel (210). Further, the back panel side (212A, 21B) may include a through-side cable cavity (240) through which, in one or more embodiments of the invention, cables, such as AC or DC power cables or network connectivity cables, may pass onwards towards adjoined or adjacent VDAs in a VDC scenario (see e.g., FIG. 4A). Each back panel side (212A, 212B) may include one or more fasteners that mate with respective cap fasteners (242) on a back panel side cap (206). Akin to the back panel (210) and the back panel sides (212A, 212B), the back panel side cap (206) may also be constructed of lightweight, rigid materials such as, for example, thermoplastics, aluminum, carbon fiber, composites, alloys, etc.

Figure 2E:
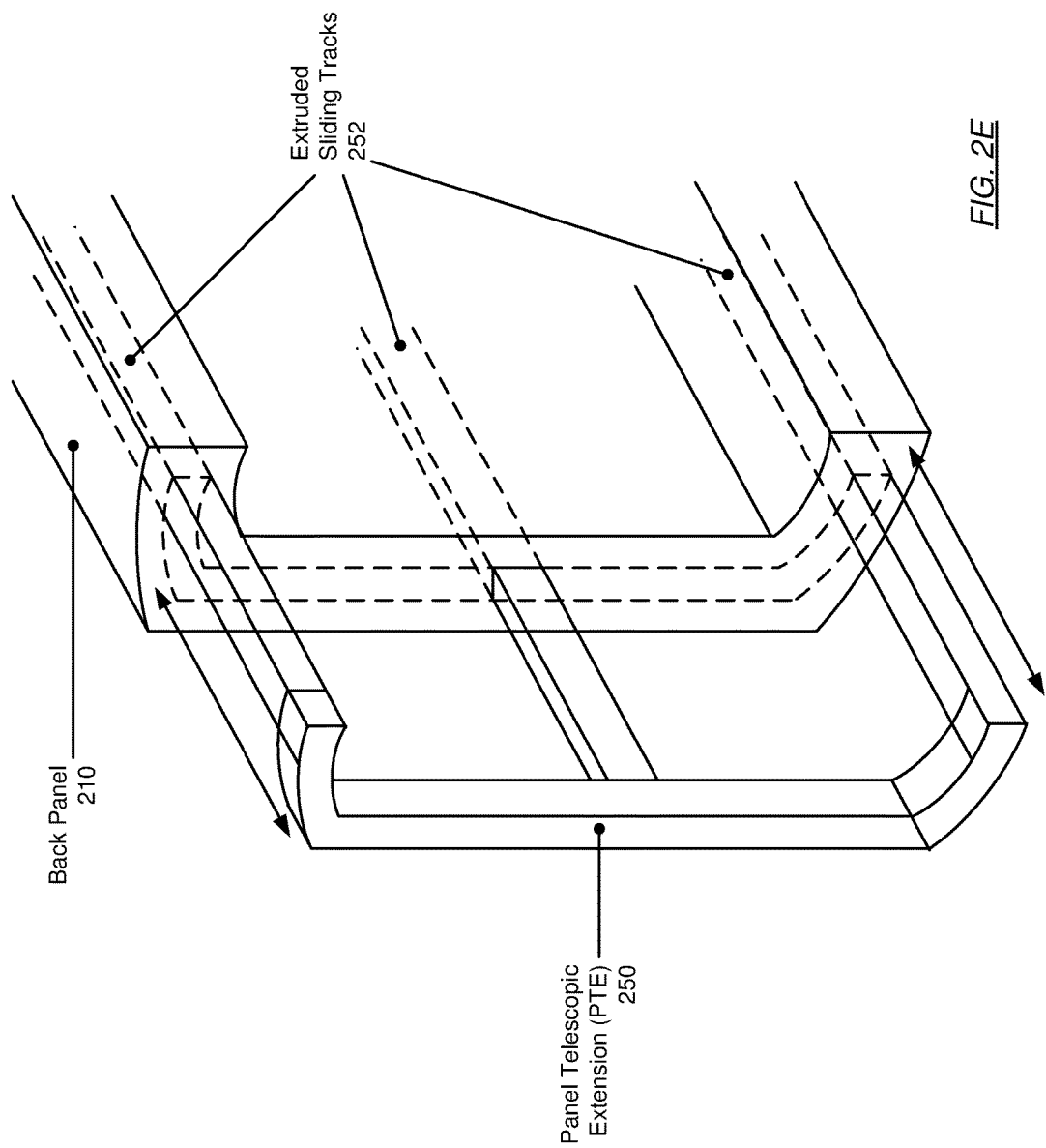
FIG. 2E shows a panel telescopic extension (PTE) in accordance with one or more embodiments of the invention.

FIG. 2E shows a panel telescopic extension (PTE) in accordance with one or more embodiments of the invention. The PTE (250) may be a skeletal extension of the back panel (210), which extends longitudinally outward from both sides of the back panel (210). In one or more embodiments of the invention, each PTE (250) is extractable from an end of the back panel (210). Moreover, extruded sliding tracks (252) interposed between the outer and inner surfaces of the back panel (210) may facilitate the extracting (e.g., sliding in and out) of the PTE (250) as appropriate. The PTE (250)

includes functionality to provide stabilizing support to docked interactive devices (see e.g., FIG. 2F) that may be larger in length than the VDA. The PTE (250) may further minimize the articulation or tilting of the interactive device when force is applied to the interactive device.

Figure 3:
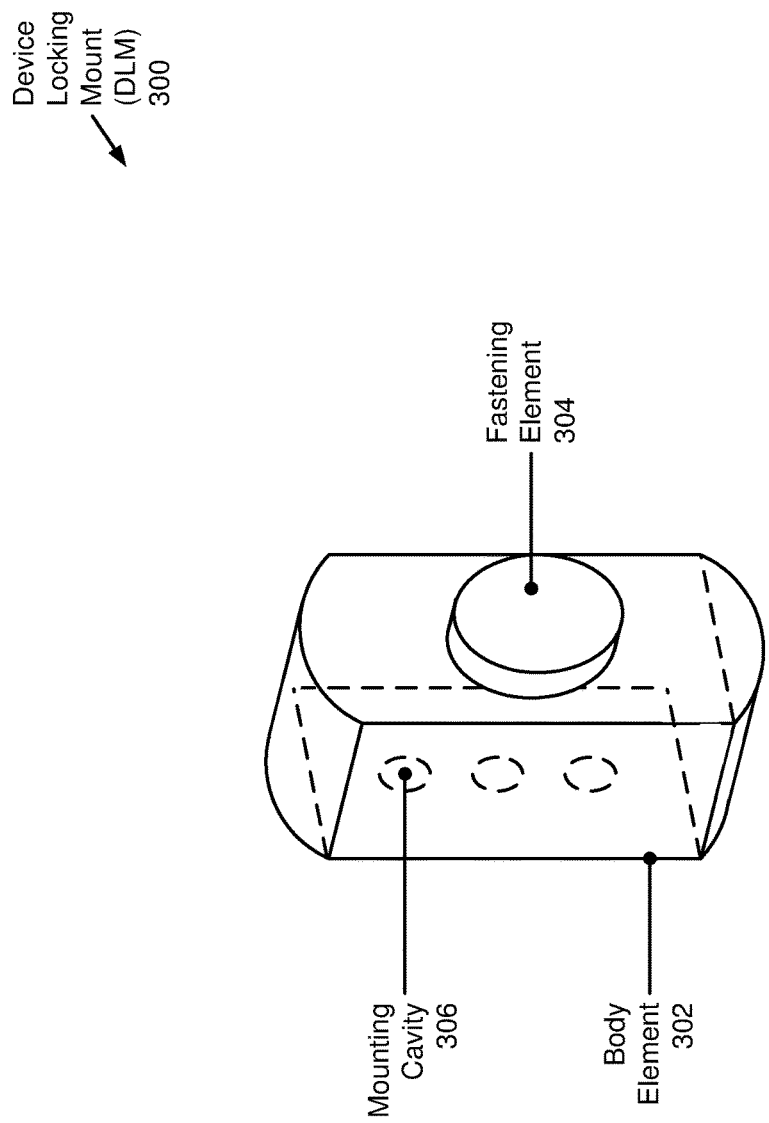
FIG. 3 shows a device locking mount (DLM) in accordance with one or more embodiments of the invention.

FIG. 3 shows a device locking mount (DLM) in accordance with one or more embodiments of the invention. As discussed above, a DLM (300) may be a physical device for securing the interactive device (further to the VDA) onto a vertical surface. A DLM (300) may further serve as a spacer between the vertical surface and the interactive device, thereby preventing the interactive device from damaging the vertical surface, or vice versa. In one or more embodiments of the invention, a DLM (300) may include additional functionality to align or position the interactive device so that the interactive device may be parallel with the vertical surface.

In one or more embodiments of the invention, a DLM (300) includes a body element (302) and a fastening element (304). The body element (302) may be a hollow construction of a lightweight, rigid material such as, for example, thermoplastics, aluminum, carbon fiber, composites, alloys, etc. In one or more embodiments of the invention, the rear of the body element (302) includes one or more mounting cavities (306) through which any form of mechanical fastener and/or high strength tape may be used to mount the DLM (300) onto the vertical surface. Furthermore, a fastening element (304) may be affixed to the front surface of the body element (302). In one or more embodiments of the invention, the fastening element (304) may be a magnetic attachment composed of any ferromagnetic materials or alloys, such as iron, nickel, cobalt, rare earth metals, etc. In one or more other embodiments of the invention, the fastening element (304) may take the form of a hook and loop fabric, a spring-loaded hook mechanism, or any other form of chemical (e.g., adhesive) or mechanical fastener. In these one or more embodiments of the invention, the fastening element (304) may couple to locking mount extrusions (see e.g., FIG. 1F) on the backside of a docked interactive device, thus further securing the interactive device to the vertical surface.

Figure 4A:
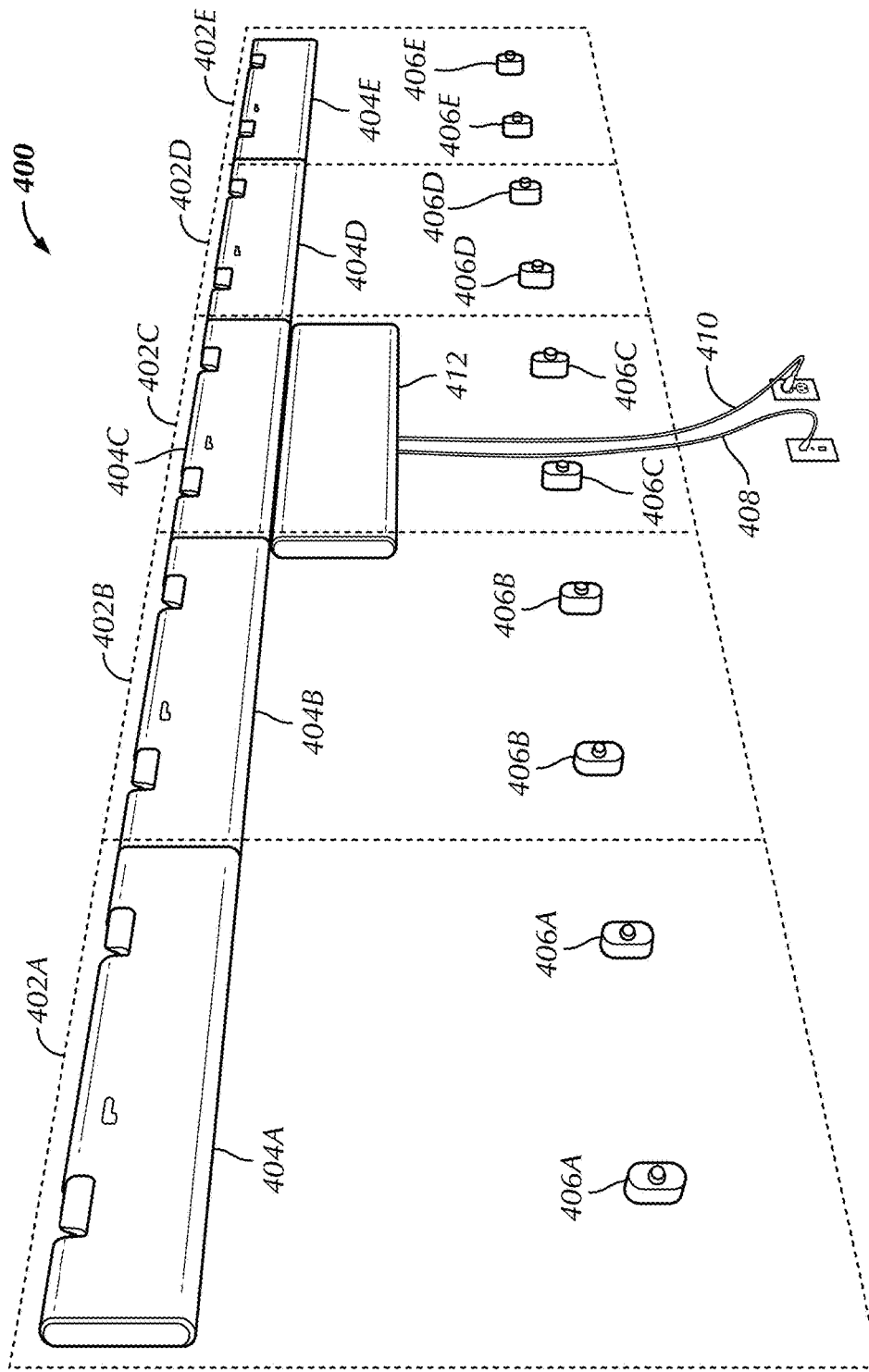
FIG. 4A shows a vertical docking cluster (VDC) in accordance with one or more embodiments of the invention.

FIG. 4A shows a vertical docking cluster (VDC) in accordance with one or more embodiments of the invention. The VDC (400) includes at least two or more vertical docking systems (VDSs) (402A-402E) mounted adjacently to one another on a common vertical surface. Subsequent to FIG. 1A discussed above, in one or more embodiments of the invention, each VDS includes a vertical docking apparatus (VDA) (404A-404E) and a pair of device locking mounts (DLMs) (406A-406E). One of ordinary skill in the relevant art would appreciate that though FIG. 4A shows the implementation of two DLMs, one or more embodiments of the invention may include the use of one DLM, or alternatively, more than two DLMs.

In one or more embodiments of the invention, as any one VDA (404A-404E) includes the functionality to replicate or disseminate power and/or other signals to other adjoined VDAs, only a single connection to a network connectivity receptacle (via a single network connectivity cable (408)) and an AC power receptacle (via a single AC power cable (410)) may be required per VDC (400). The number of VDSs that form a VDC (400) may only be limited by the length of or amount of space on a vertical surface onto which the VDC (400) is mounted.

In one or more embodiments of the invention, each VDA (404A-404E) in the VDC (400) may include functionality to communicate or exchange information, such as device identification information, amongst one another. To achieve this aforementioned functionality, each VDA (404A-404E) may include a small-footprint (or single-board) computer, which may store and/or share pertinent information with other VDAs (404A-404E) with which the small-footprint computer is operatively connected. In one or more embodiments of the invention, device identification information may be a unique identifier designated to a VDS (402A-402E), a VDA (404A-404E), and/or a correspondingly docked interactive device (see e.g., FIG. 4B). Moreover, in these one or more embodiments, the device identification information may be used to configure settings pertaining to software executing on the docked interactive device, which may enable the docked interactive device to identify its placement in a cluster (see e.g., FIG. 4B) relative to other VDAs and/or interactive devices. Additional or alternative information may be exchanged between the VDAs (404A-404E) without departing from the scope of the invention.

In one or more embodiments of the invention, the VDC (400) may additionally include a distribution hub (412). The distribution hub (412) may be a physical device from which power, network connectivity, and/or other peripherals or signals are disseminated to the multiple VDAs (404A-404E) of the VDC (400). In one or more embodiments of the invention, the distribution hub (412) may serve as a connections nexus for the VDC (400). Additional details pertaining to the distribution hub (412) are described below with respect to FIGS. 7A-7C.

While FIG. 4A shows a configuration of components, VDC configurations other than that shown in FIG. 4A may be used without departing from the scope of the invention. For example, instead of being mounted onto a common vertical surface, the two or more VDSs of a VDC may each couple to a respective stand structure (see e.g., FIG. 8G) and yet still be presented adjacently to one another.

Figure 4B:
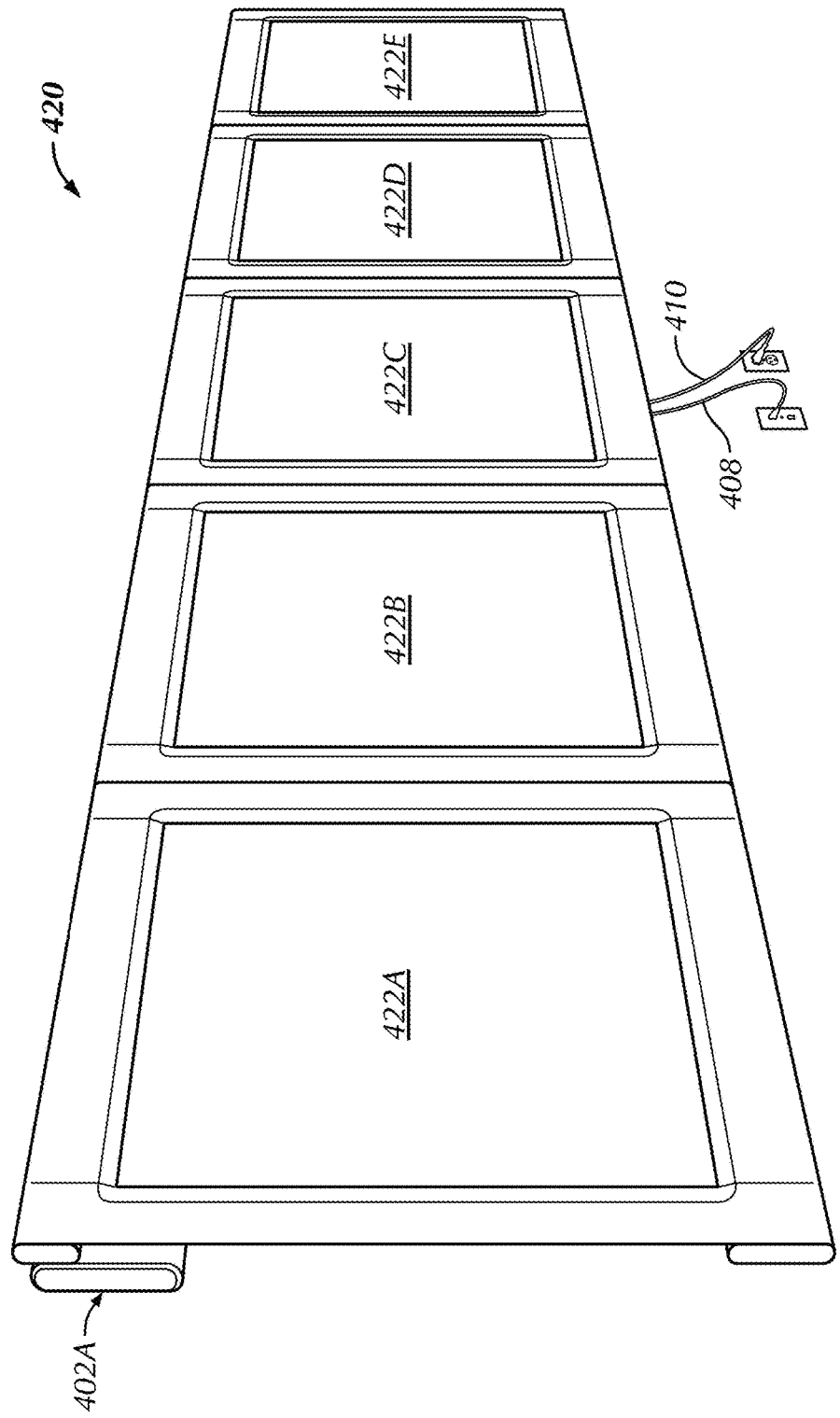
FIG. 4B shows a cluster of systems in accordance with one or more embodiments of the invention.

FIG. 4B shows a cluster of systems in accordance with one or more embodiments of the invention. The cluster of systems (420) includes at least two or more vertical docking systems (VDSs) (402A-402E) (e.g., a VDC (400)), each of which is operatively connected to a corresponding interactive device (422A-422E).

Figure 5:
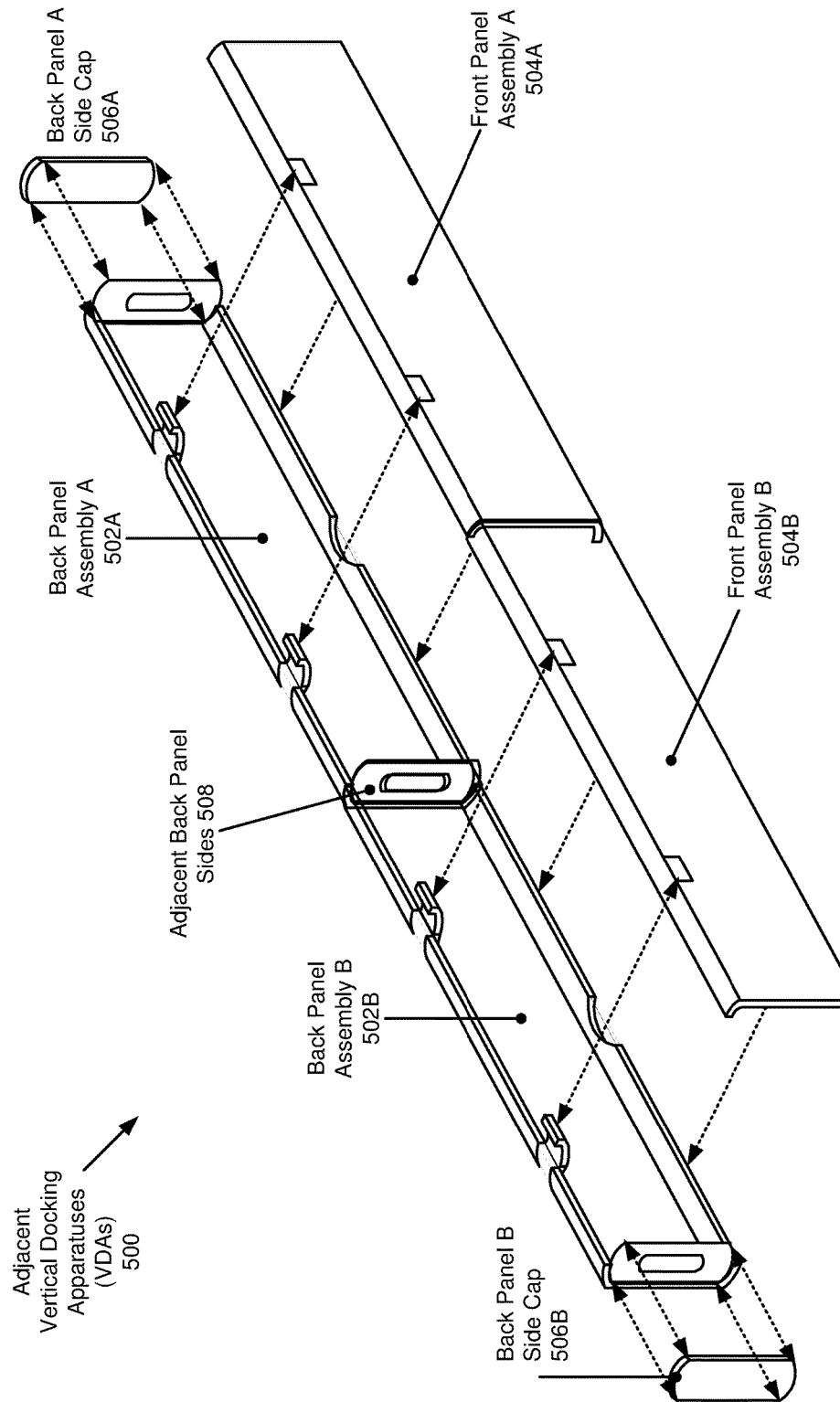
FIG. 5 shows adjoined vertical docking apparatuses (VDAs) in accordance with one or more embodiments of the invention.

FIG. 5 shows adjacent vertical docking apparatuses (VDAs) in accordance with one or more embodiments of the invention. Within a VDC, as discussed above, the multiple VDAs may be mounted side-by-side along the length of a common vertical surface. At the adjacent back panel sides (508) between each pair of adjacent VDAs in the VDC, respective back panel side caps (506A, 506B) may not be fastened in order to enable the traversal and/or management of connections (e.g., network connectivity connections, power connections, etc.) throughout the VDC. Back panel side caps (506A, 506B) may, however, be fastened to exposed back panel sides on the pair of VDAs on the farthest ends of the VDC.

In one or more embodiments of the invention, similar to the above discussion relative to FIG. 2A, each VDA includes a back panel assembly (502A, 502B) oppositely disposed and operatively connected to a respective front panel assembly (504A, 504B). When fastened together, the back panel assembly (502A, 502B) and the front panel assembly (504A, 504B) form a hollow manifold/structure within which additional components (not shown) are housed and/or protected. The back panel assembly (502A, 502B) and the front panel assembly (504A, 504B) may be fastened together using two or more of any form of mechanical fastener (not shown) such as, for example, latches, magnets, clips, rivets, hinges, etc. In one or more embodiments of the invention, the back panel assembly (502A, 502B), the front panel assembly (504A, 504B), and/or a hinged portion (not shown) coupling the back panel assembly (502A, 502B) and front panel assembly (504A, 504B) together may be manufactured, collectively, as a single contiguous component (e.g., an injection molding operation would create the back panel assembly (502A, 502B), the front panel assembly (504A, 504B), and the hinged portion at one time as a single component/piece). In these one or more embodiments, the hinged portion (not shown) may be implemented as a living hinge, or a thin flexible hinge constructed of the same materials as the back panel assembly (502A, 502B) and/or front panel assembly (504A, 504B), or any other flexible and durable material, such as polypropylene, polyethylene, etc. In these one or more embodiments, the hinged portion may include functionality to enable the rotation of the front panel assembly (504A, 504B), relative to the back panel assembly (502A, 502B), about one axis up to (and/or exceeding) 180 degrees. The hinged portion may be designed to outlast repeated bending without failure.

Figure 6A:
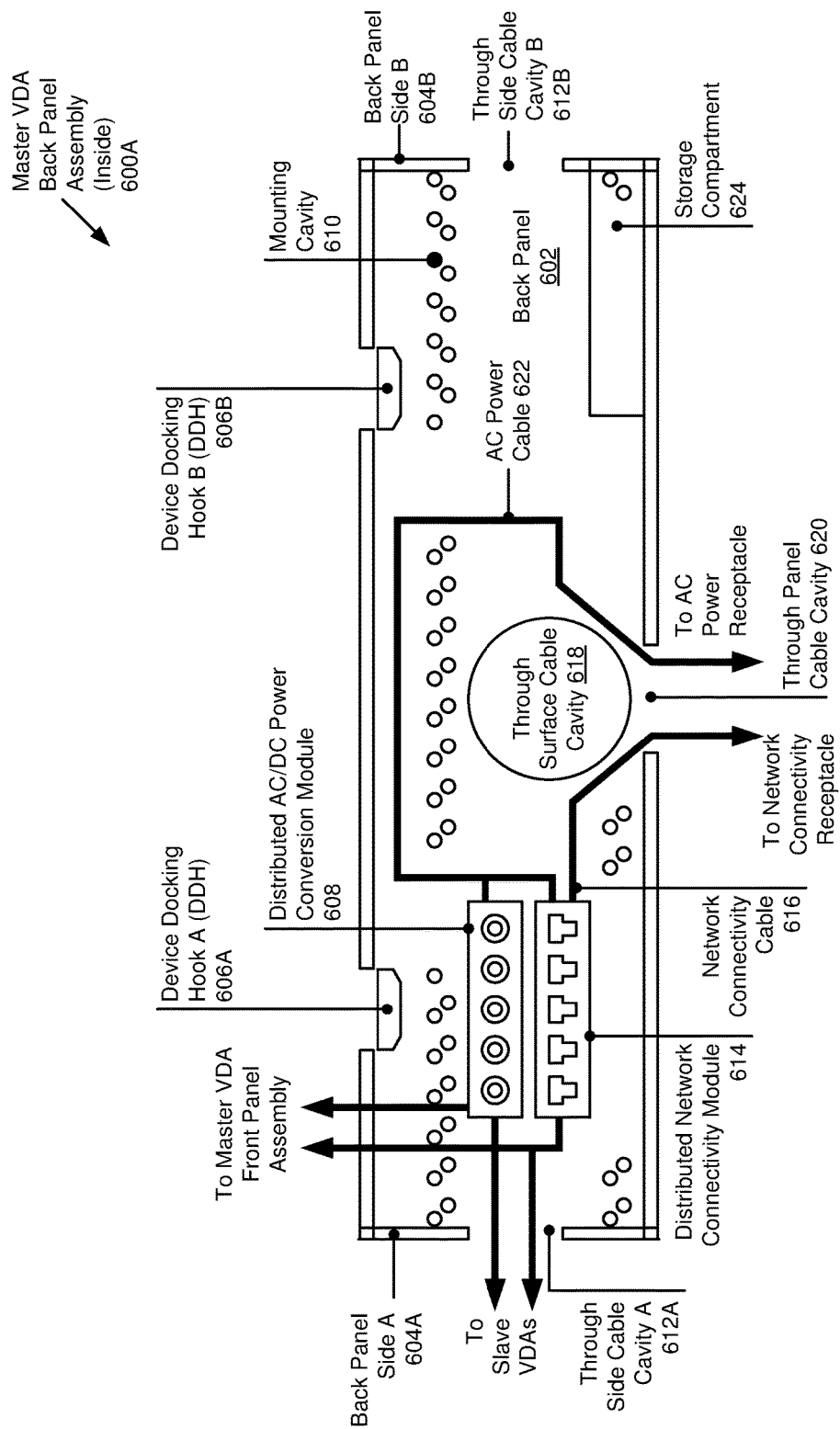
FIG. 6A shows a master VDA back panel assembly in accordance with one or more embodiments of the invention.

FIG. 6A shows a master VDA back panel assembly in accordance with one or more embodiments of the invention. In scenarios where a distribution hub (see e.g., FIG. 4A) is not installed alongside a VDC, in one or more embodiments of the invention, a particular VDA in the VDC may be designated a master VDA and serve as the connections nexus for the VDC in place of the distribution hub. In one or more embodiments of the invention, the centermost VDA in the VDC may be designated the master VDA, and thus include the appropriate components (discussed below) to replicate and disseminate the necessary connections to the remaining VDAs (designated slave VDAs (see e.g., FIGS. 6B and 6D)) of the VDC.

In one or more embodiments of the invention, a master VDA back panel assembly (600A) may be substantially similar to the back panel assembly (202) illustrated in FIG. 2B. With respect to similarities, the master VDA back panel assembly (600A) includes a back panel (602), a pair of back panel sides (604A, 604B), each with a respective through-side cable cavity (612A, 612B), a pair of device docking hooks (DDHs) (606A, 606B), a through-surface cable cavity (618), and a storage compartment (624). In terms of differences, a master VDA back panel assembly (600A) may further include a distributed AC/DC power conversion module (608) and a distributed network connectivity module (614). Each of these components is described below.

In one or more embodiments of the invention, the distributed AC/DC power conversion module (608) may be a physical device that includes the functionality to replicate a single input AC power connection to multiple output DC power connections. The distributed AC/DC power conversion module (608) may be affixed to the inside surface of the back panel (602), and thus lie interposed between the back panel assembly (600A) and the front panel assembly (not shown). The distributed AC/DC power conversion module (608) may include one or more circuits (e.g., rectifiers) for converting AC electrical power into DC electrical power. The distributed AC/DC power conversion module (608) may also include one or more circuits (e.g., transformers, voltage dividers, voltage regulators, etc.) that step down or convert an input voltage (e.g., from the AC power receptacle) at a first voltage level to an output voltage at a second voltage level, which would be better suited for powering the interactive devices and/or other components of the master or slave VDAs (e.g., the distributed network connectivity module (614), etc.). Unlike the AC/DC power conversion module (220) depicted in FIG. 2B, which provided one-to-one functionality, the distributed AC/DC power conversion module (608) may provide a one-to-many functionality. That is, in one or more embodiments of the invention, the distributed AC/DC power conversion module (608) may be fed a single AC power input line (e.g., the AC power cable (622)) and subsequently provide multiple DC power output lines that may be operatively connected to the master VDA front panel assembly and one or more slave VDAs in the VDC.

In one or more embodiments of the invention, the distributed network connectivity module (614) may be a physical device that includes the functionality to replicate a single input network connectivity connection (e.g., the network connectivity cable (616)) to multiple output network connectivity connections, which may be operatively connected to the master VDA front panel assembly and one or more slave VDAs in the VDC. The distributed network connectivity module (614) may be affixed to the inside surface of the back panel (602), and thus lie interposed between the back panel assembly (600A) and the front panel assembly (not shown). The distributed network connectivity module (614) may include persistent storage, memory (e.g., random access memory (RAM)), one or more processors (including a switch chip), and two or more physical ports. In one or more embodiments of the invention, the switch chip may be hardware (e.g., integrated circuits) that determines which egress port of the distributed network connectivity module (614) to forward networking packets. In one or more embodiments of the invention, the distributed network connectivity module (614) may be a third-party networking switch, router, bridge, or multilayer switch.

Figure 6B:
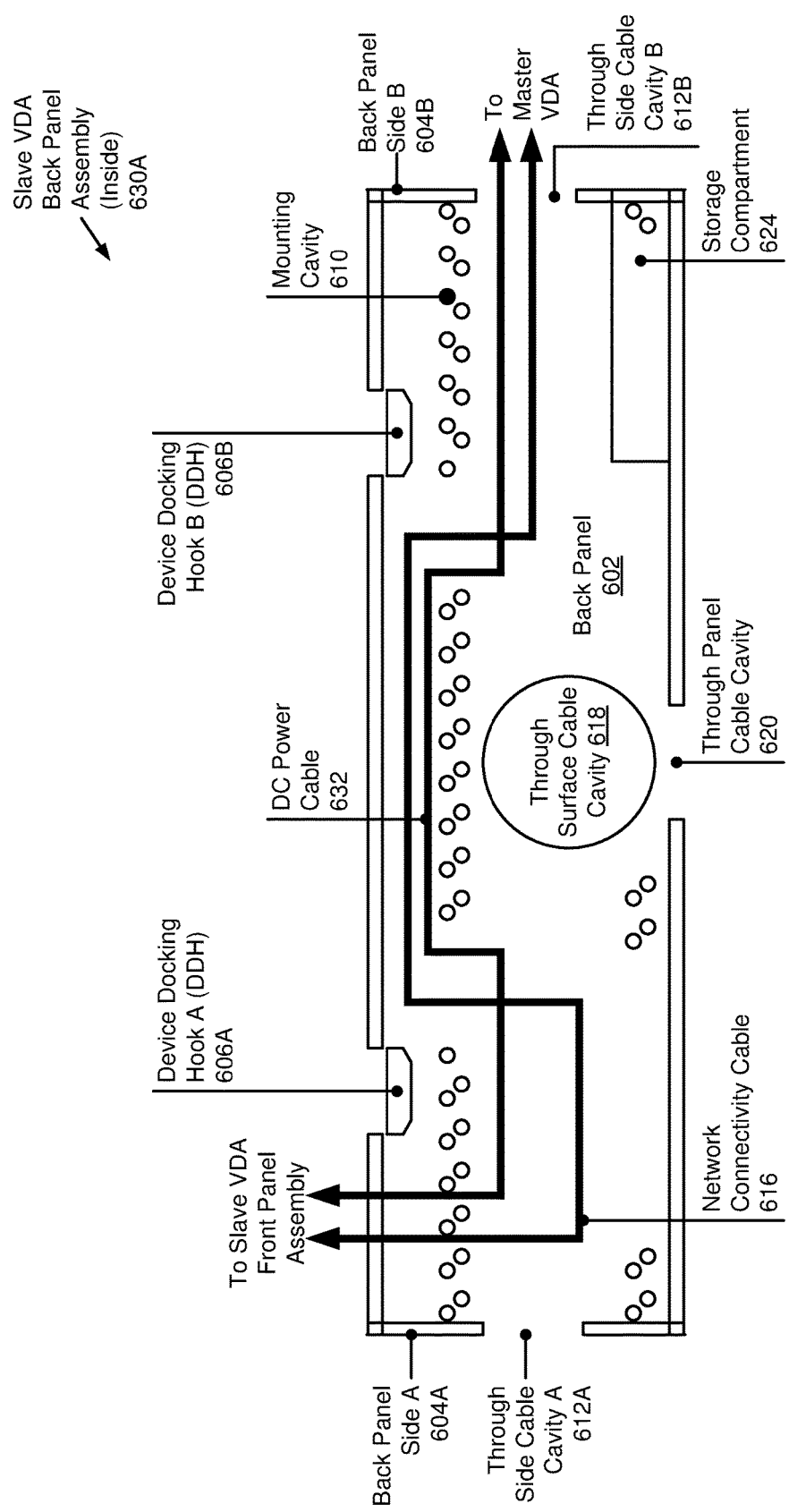
FIG. 6B shows a slave VDA back panel assembly in accordance with one or more embodiments of the invention.

FIG. 6B shows a slave VDA back panel assembly in accordance with one or more embodiments of the invention. The slave VDA back panel assembly (630A) portrayed in FIG. 6B complements the master VDA back panel assembly (600A) illustrated in FIG. 6A. As such, because the master VDA back panel assembly (600A) (associated with a master VDA in a VDC) includes a distributed AC/DC power conversion module (608), each slave VDA back panel assembly (630A) (associated with each slave VDA in the VDC) does not require additional components/circuitry to provide the necessary direct current (DC) to power the respective front panel assembly (not shown) and the docked interactive device (not shown).

Figure 6C:
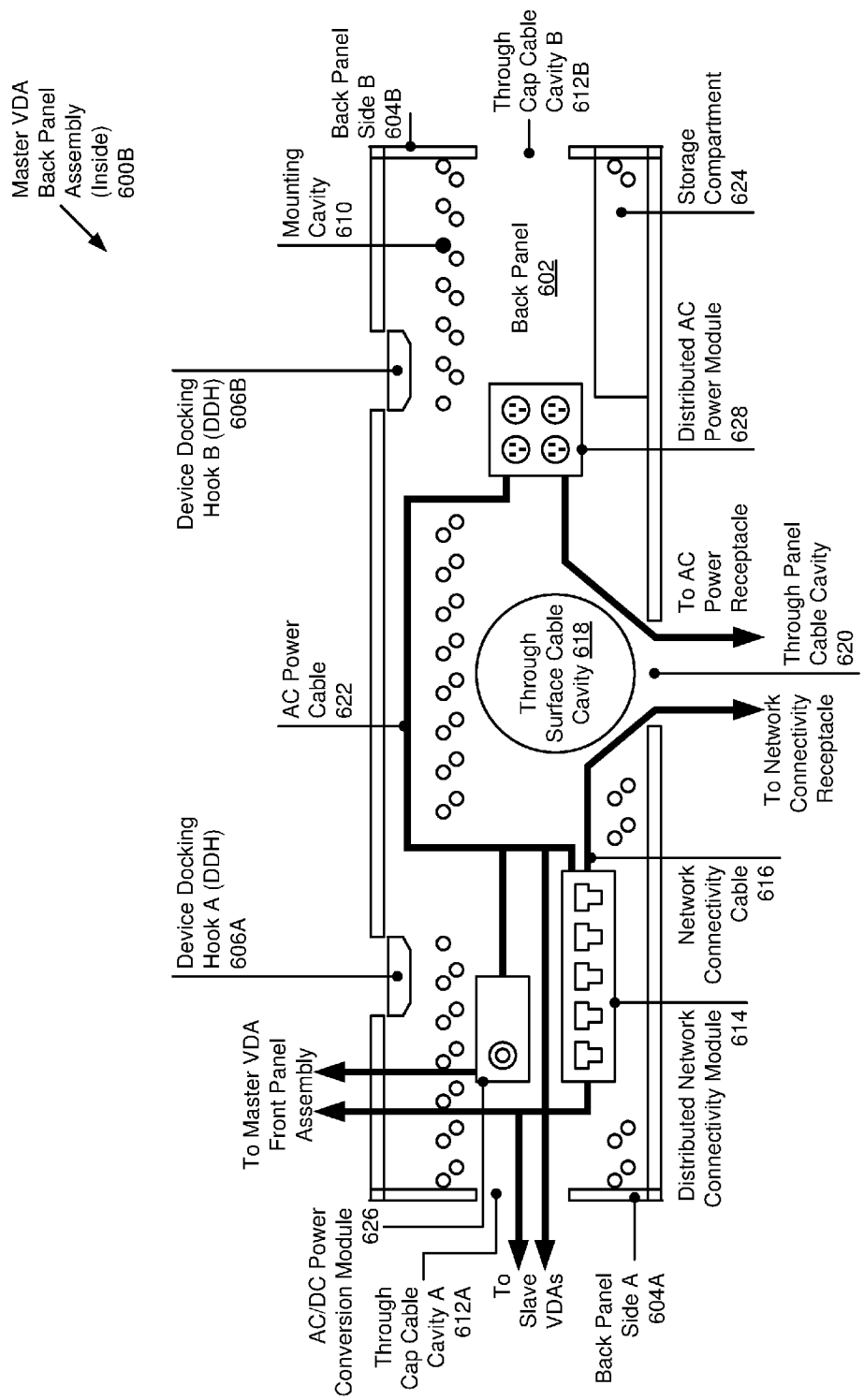
FIG. 6C shows a master VDA back panel assembly in accordance with one or more embodiments of the invention.

FIG. 6C shows a master VDA back panel assembly in accordance with one or more embodiments of the invention. Specifically, FIG. 6C shows another configuration for a master VDA back panel assembly unlike the master VDA back panel assembly portrayed in FIG. 6A. In this version, the master VDA back panel assembly (600B) includes an AC/DC power conversion module (626), thus replacing the distributed AC/DC power conversion module (608) of FIG. 6A, and further includes a distributed AC power module (628). Each of these components is described below.

In one or more embodiments of the invention, the AC/DC power conversion module (626) is substantially similar to the AC/DC power conversion module (220) described above with respect to FIG. 2B. Subsequently, the AC/DC power conversion module (626) may be affixed to the inside surface of the back panel (602), and thus lie interposed between the back panel assembly (600B) and the front panel assembly (not shown) of the master VDA. The AC/DC power conversion module (626) may include circuitry (e.g., rectifiers) for converting AC electrical power into DC electrical power. The AC/DC power conversion module (626) may also include circuitry (e.g., transformers, voltage dividers, voltage regulators, etc.) that step down or convert an input voltage (e.g., from the AC power receptacle) at a first voltage level to an output voltage at a second voltage level.

The AC/DC power conversion module (626) provides a one-to-one functionality, thereby supplying a single output DC line to the master VDA front panel assembly specifically based on a single input AC line (e.g., the AC power cable (622)) originating from the distributed AC power module (628).

In one or more embodiments of the invention, the distributed AC power module (628) may be a physical device that includes the functionality to replicate a single input AC power connection to multiple output AC power connections. The distributed AC power module (628) may be affixed to the inside surface of the back panel (602), and thus lie interposed between the back panel assembly (600B) and the front panel assembly (not shown) of the master VDA. The distributed AC power module (628) may include circuitry (e.g., parallel circuits and sockets) that allows multiple devices (e.g., VDAs, interactive devices, other VDA internal components, etc.) to be powered from a single power receptacle. In one or more embodiments of the invention, the aforementioned multiple AC power connections may operatively connect the distributed AC power module (628) to AC/DC power conversion modules (e.g., 626) included in the master VDA as well as one or more slave VDAs. In one or more embodiments of the invention, the distributed AC power module (628) may be a third-party power strip or surge protector strip.

Figure 6D:
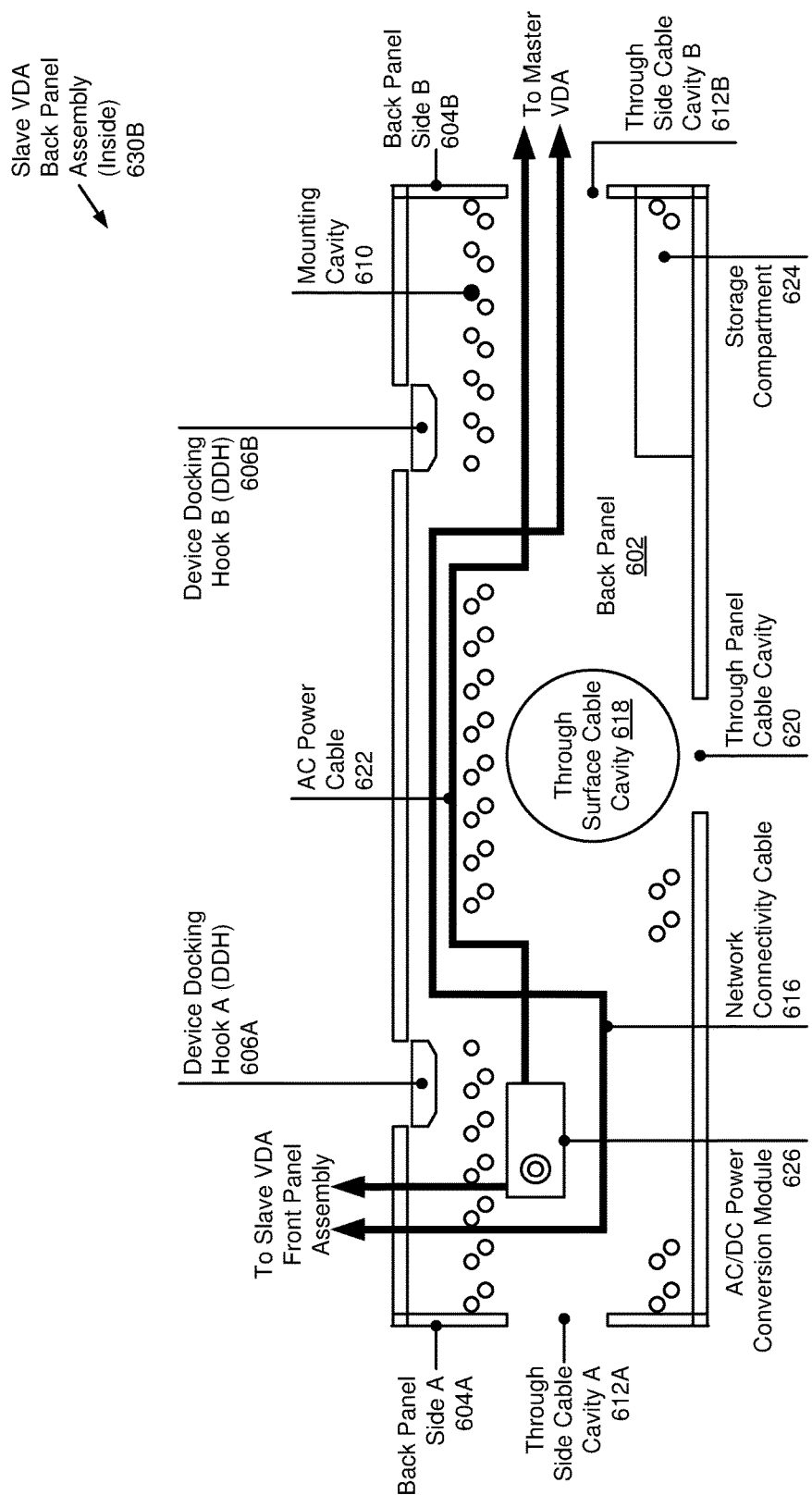
FIG. 6D shows a slave VDA back panel assembly in accordance with one or more embodiments of the invention.

FIG. 6D shows a slave VDA back panel assembly in accordance with one or more embodiments of the invention. Specifically, FIG. 6D shows another configuration for a slave VDA back panel assembly unlike the slave VDA back panel assembly portrayed in FIG. 6B. Furthermore, the slave VDA back assembly (630B) portrayed in FIG. 6D complements the master VDA back panel assembly (600B) configuration presented in FIG. 6C.

In one or more embodiments of the invention, because the corresponding master VDA back panel assembly (600B) configuration lacks a distributed AC/DC power conversion module (608), each slave VDA that which is operatively connected to the master VDA is required to include an individual AC/DC power conversion module (626). As described above, the AC/DC power conversion module (626) may be affixed to the inside surface of the back panel (602), and thus lie interposed between the back panel assembly (630B) and the front panel assembly (not shown) of the slave VDA. The AC/DC power conversion module (626) may include circuitry (e.g., rectifiers) for converting AC electrical power into DC electrical power. The AC/DC power conversion module (626) may also include circuitry (e.g., transformers, voltage dividers, voltage regulators, etc.) that step down or convert an input voltage (e.g., from the AC power receptacle) at a first voltage level to an output voltage at a second voltage level. The AC/DC power conversion module (626) provides a one-to-one functionality, thereby supplying a single output DC line to the slave VDA front panel assembly specifically based on a single input AC line (e.g., the AC power cable (622)) originating from the distributed AC power module (628) included in the master VDA.

While FIGS. 6A-6D show several configurations of components, master and slave back panel assembly configurations other than those shown in FIGS. 6A-6D may be used without departing from the scope of the invention. For example, a master back panel assembly may include additional or alternative components for disseminating additional or alternative signals across all VDAs and/or interactive devices within a VDC. Subsequently, a slave back panel assembly may include additional or alternative components to complement the functionalities provided by the master back panel assembly.

Figure 7A:
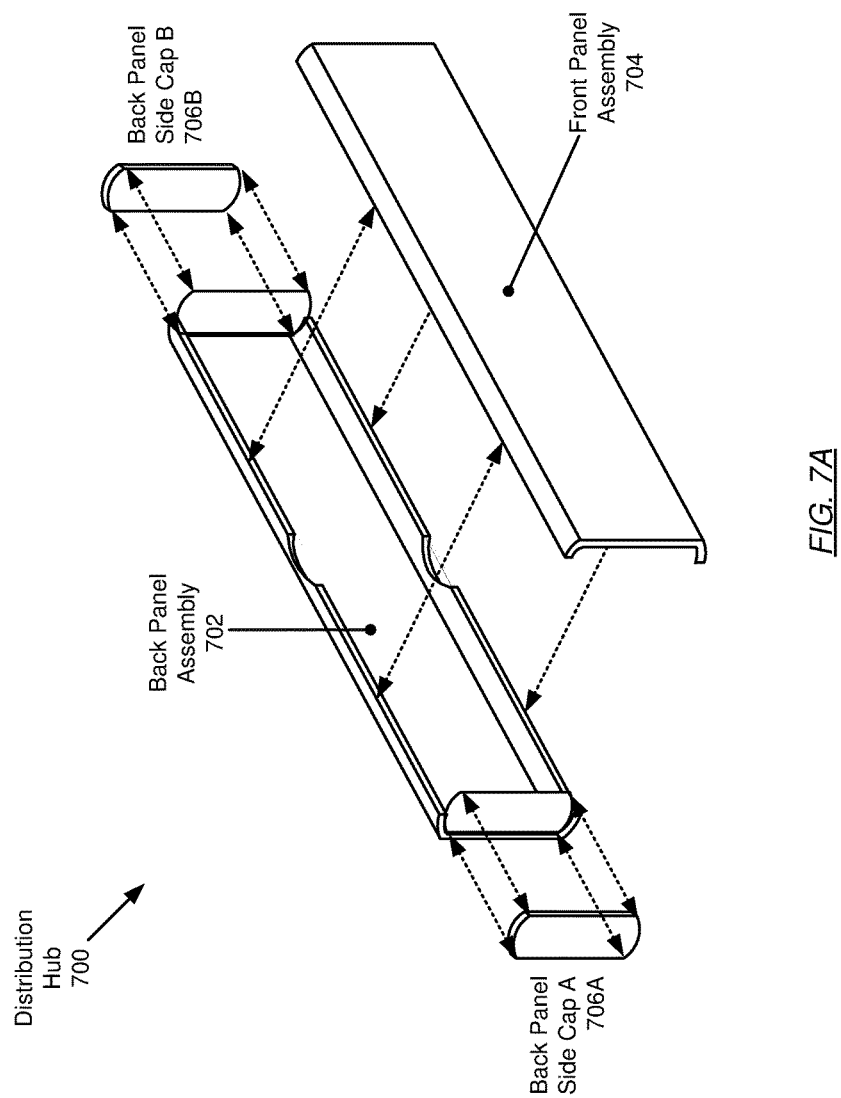
FIG. 7A shows a distribution hub in accordance with one or more embodiments of the invention.

FIG. 7A shows a distribution hub in accordance with one or more embodiments of the invention. As mentioned above, in one or more embodiments of the invention, the distribution hub (700) may be a physical device from which power, network connectivity, and/or other peripherals or signals are disseminated to the multiple VDAs within a VDC. In one or more embodiments of the invention, the distribution hub (700) may serve as a connections *nexus* for the VDC. Similar to a vertical docking apparatus (VDA) (see e.g., FIG. 2A), the distribution hub (700) includes a back panel assembly (702) oppositely disposed and operatively connected to a front panel assembly (704). When fastened together, the back panel assembly (702) and the front panel assembly (704) form a hollow manifold/structure within which additional components (not shown) are housed and/or protected. The back panel assembly (702) and the front panel assembly (704) may be fastened together using two or more of any form of mechanical fastener (not shown) such as, for example, latches, magnets, clips, rivets, hinges, etc. In one or more embodiments of the invention, the back panel assembly (702), the front panel assembly (704), and/or a hinged portion (not shown) coupling the back panel assembly (702) and front panel assembly (704) together may be manufactured, collectively, as a single contiguous component (e.g., an injection molding operation would create the back panel assembly (702), the front panel assembly (704), and the hinged portion at one time as a single component/piece). In these one or more embodiments, the hinged portion (not shown) may be implemented as a living hinge, or a thin flexible hinge constructed of the same materials as the back panel assembly (702) and/or front panel assembly (704), or any other flexible and durable material, such as polypropylene, polyethylene, etc. In these one or more embodiments, the hinged portion may include functionality to enable the rotation of the front panel assembly (704), relative to the back panel assembly (702), about one axis up to (and/or exceeding) 180 degrees. The hinged portion may be designed to outlast repeated bending without failure.

In one or more embodiments of the invention, the distribution hub (700) further includes a pair of back panel side caps (706A, 706B), which may be fastened to the sides of the back panel assembly (702). Each back panel side cap (706A, 706B) may be fastened to a respective side of the back panel assembly (702) using one or more of any form of mechanical fastener (not shown) such as those exemplified earlier. In one or more other embodiments of the invention, the front panel assembly (704) may be equipped with the same mounting mechanisms as a device locking mount (DLM), thus making the distribution hub (700) part of the DLM.

Figure 7B:
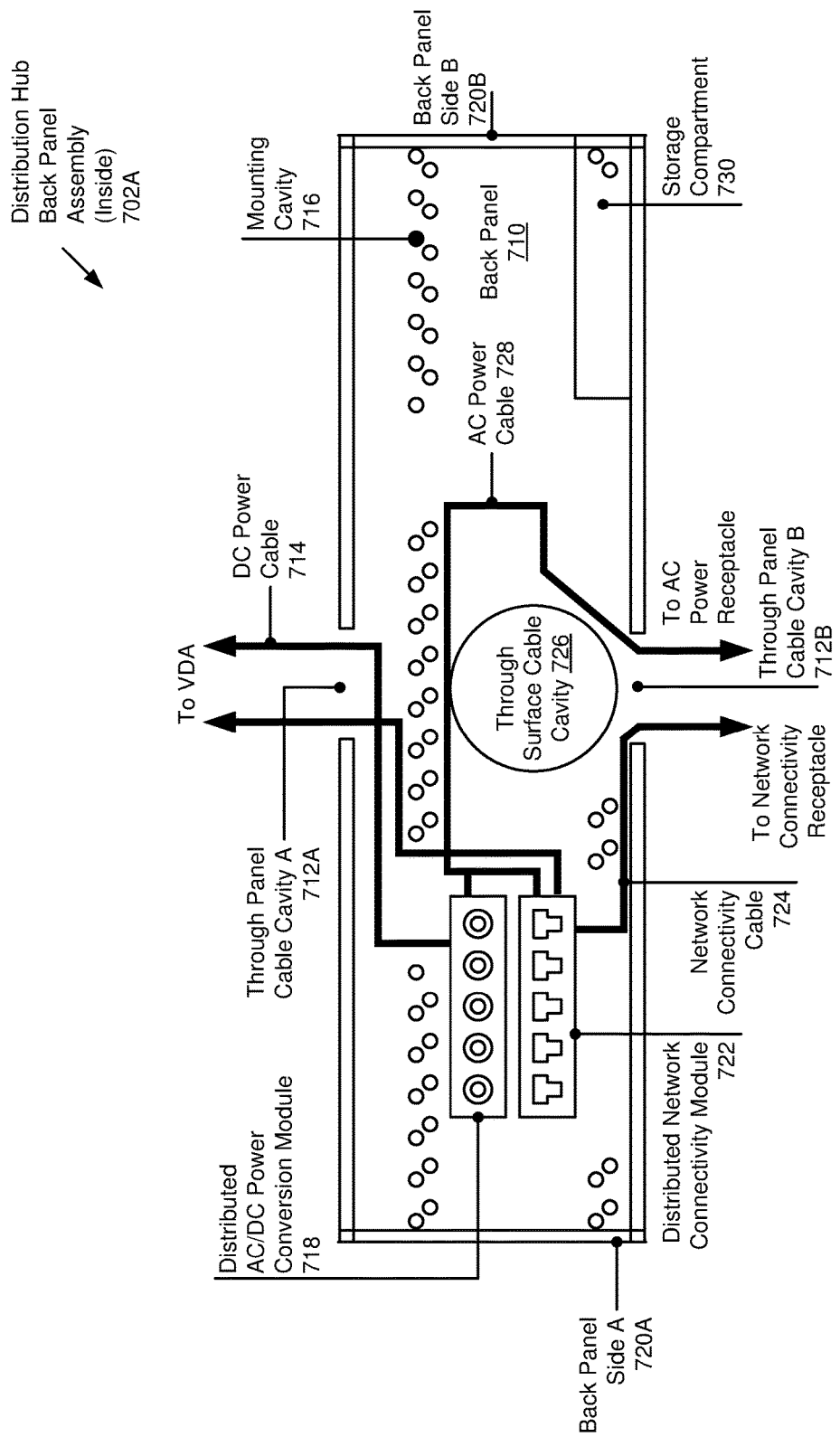
FIG. 7B shows a distribution hub back panel assembly in accordance with one or more embodiments of the invention.
Figure 7C:
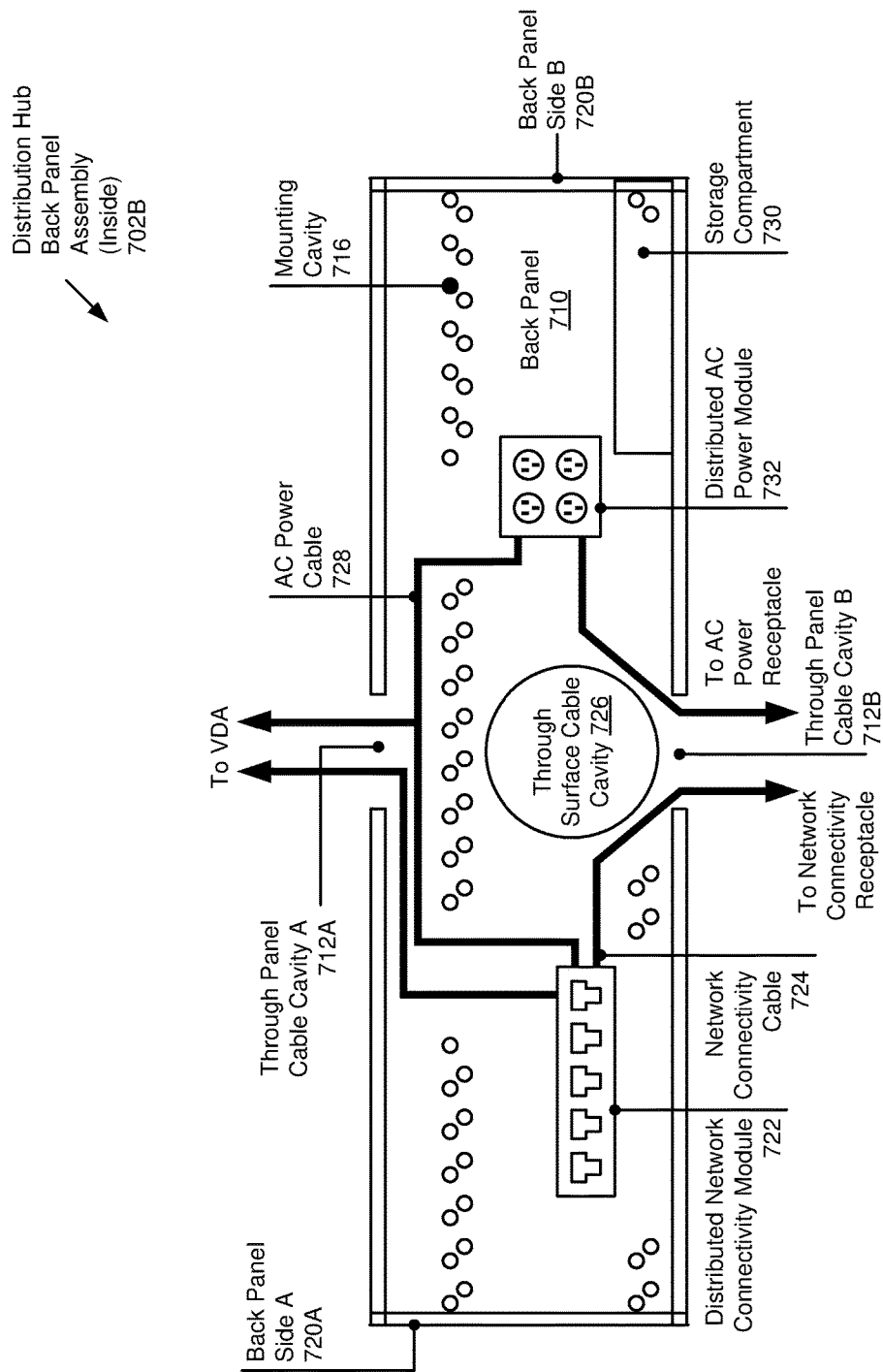
FIG. 7C shows a distribution hub back panel assembly in accordance with one or more embodiments of the invention.

FIGS. 7B and 7C show different configurations of a distribution hub back panel assembly in accordance with one or more embodiments of the invention. The distribution hub back panel assemblies (702A, 702B) shown in FIGS. 7B and 7C are configured substantially similar to the master VDAs illustrated in FIGS. 6A and 6C, respectively. Unlike the master VDA back panel assembly (600A, 600B), the distribution hub back panel assemblies (702A, 702B) include a second through-panel cable cavity (712A) on the topside of the distribution hub (700) through which the various connections (e.g., for network connectivity, power, etc.) stemming from the distribution hub (700) to the two or more VDAs in a VDC traverse.

Figure 8A:
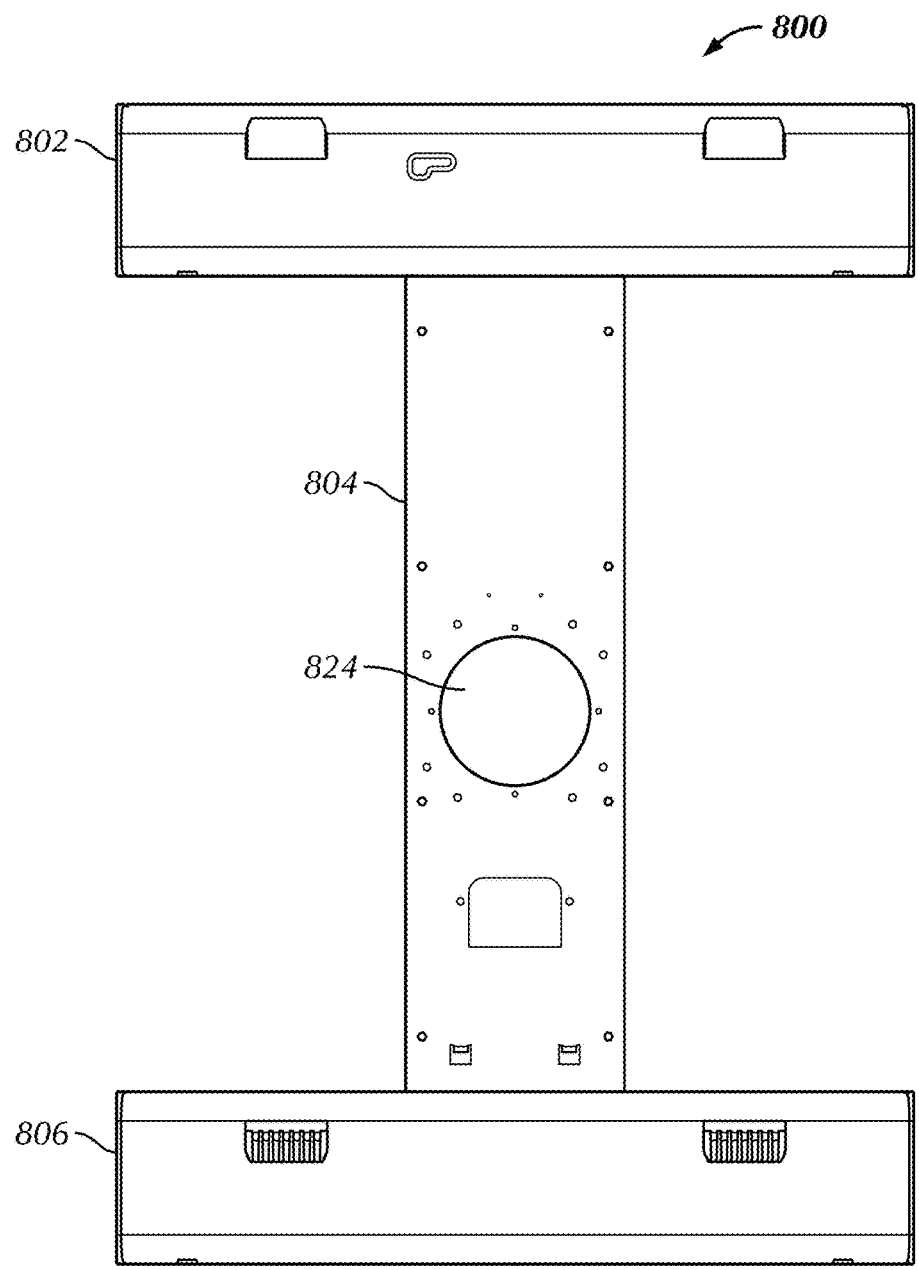
FIG. 8A shows a vertical docking system (VDS) in accordance with one or more embodiments of the invention.
Figure 8B:
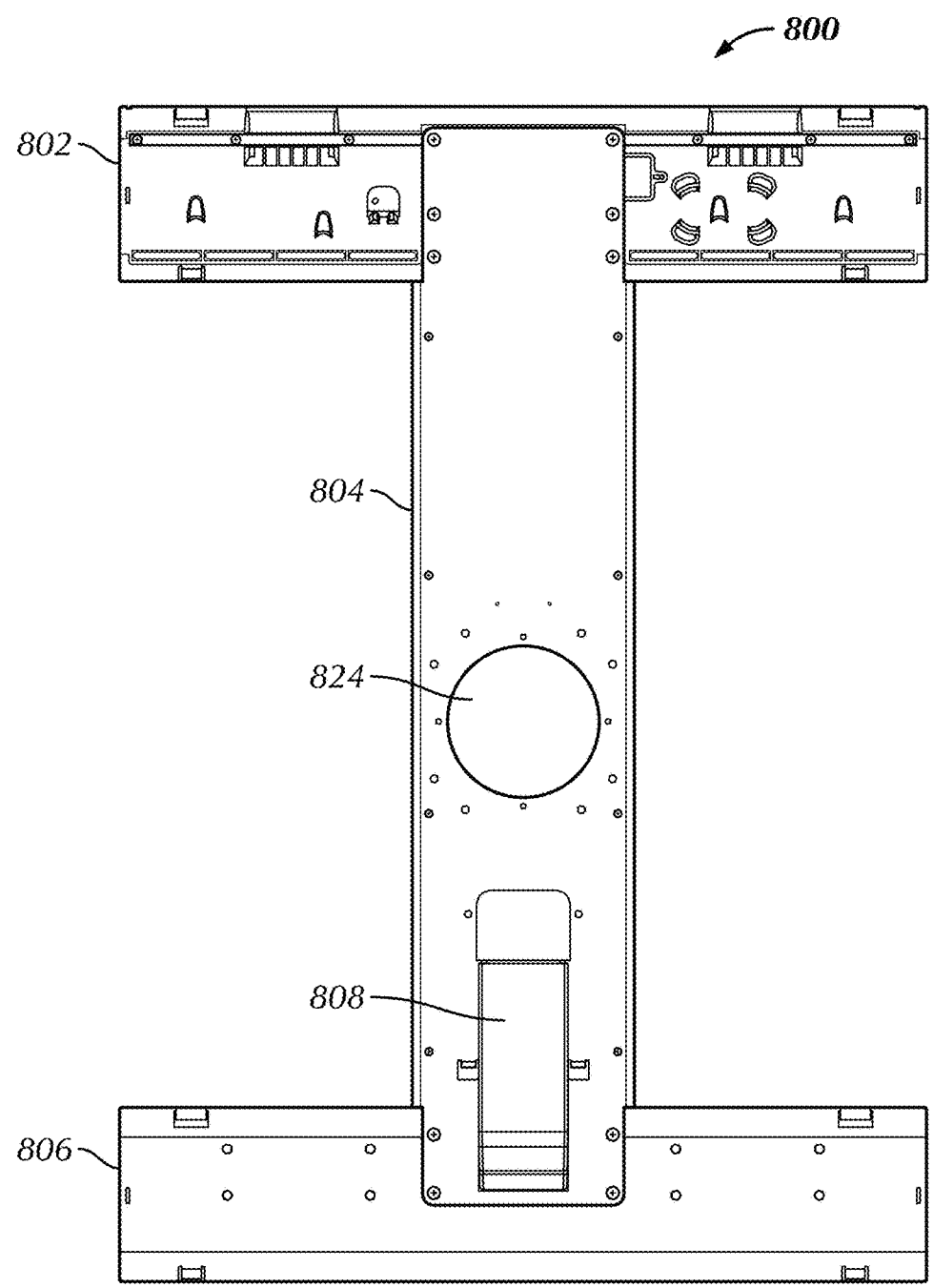
FIG. 8B shows a vertical docking system (VDS) in accordance with one or more embodiments of the invention.
Figure 8C:
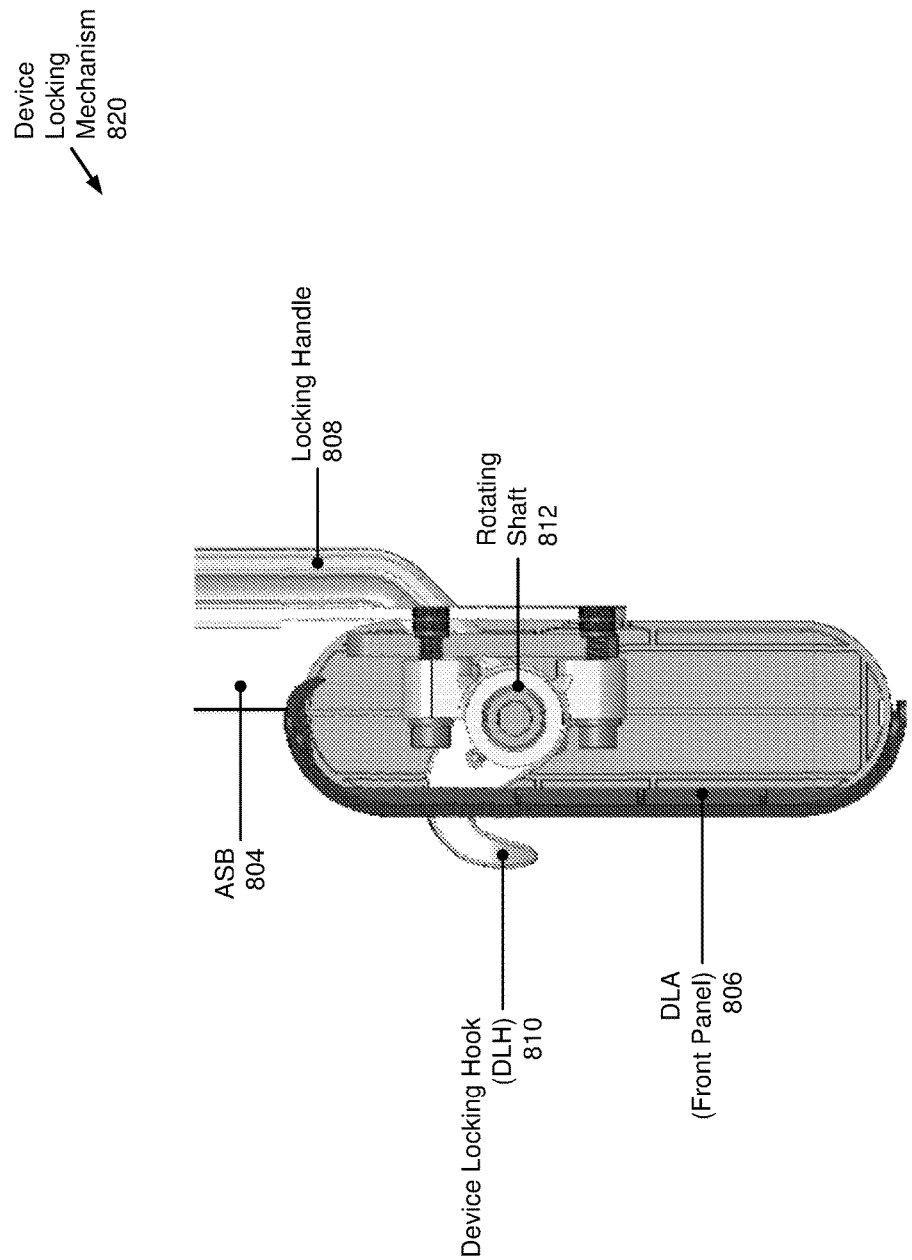
FIG. 8C shows a device locking mechanism in accordance with one or more embodiments of the invention.
Figure 8D:
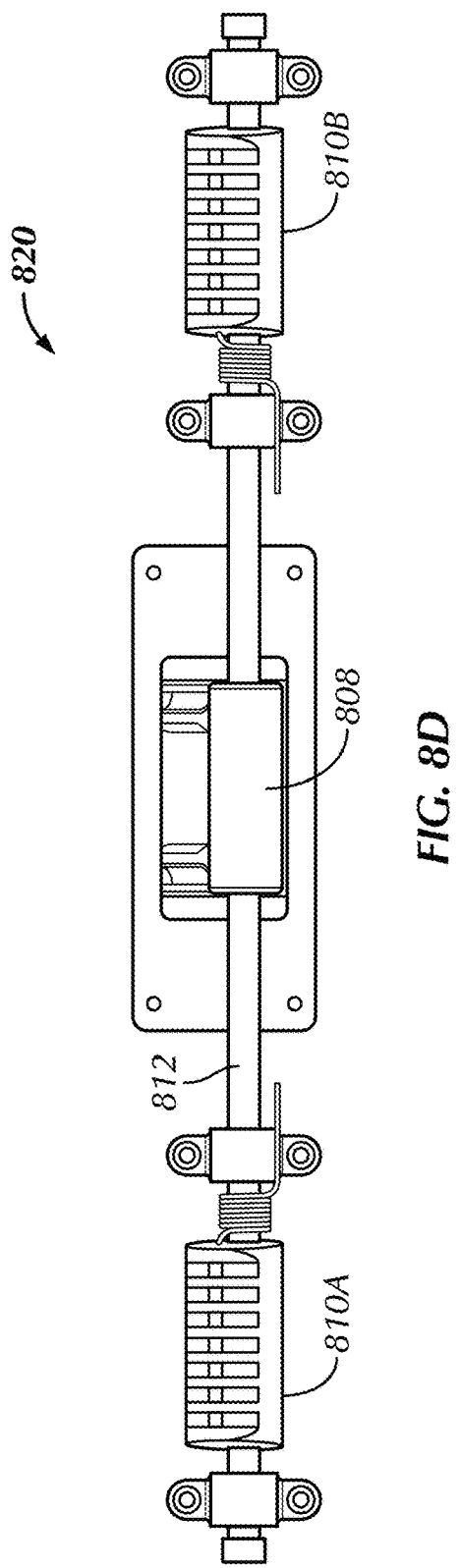
FIG. 8D shows a device locking mechanism in accordance with one or more embodiments of the invention.
Figure 8E:
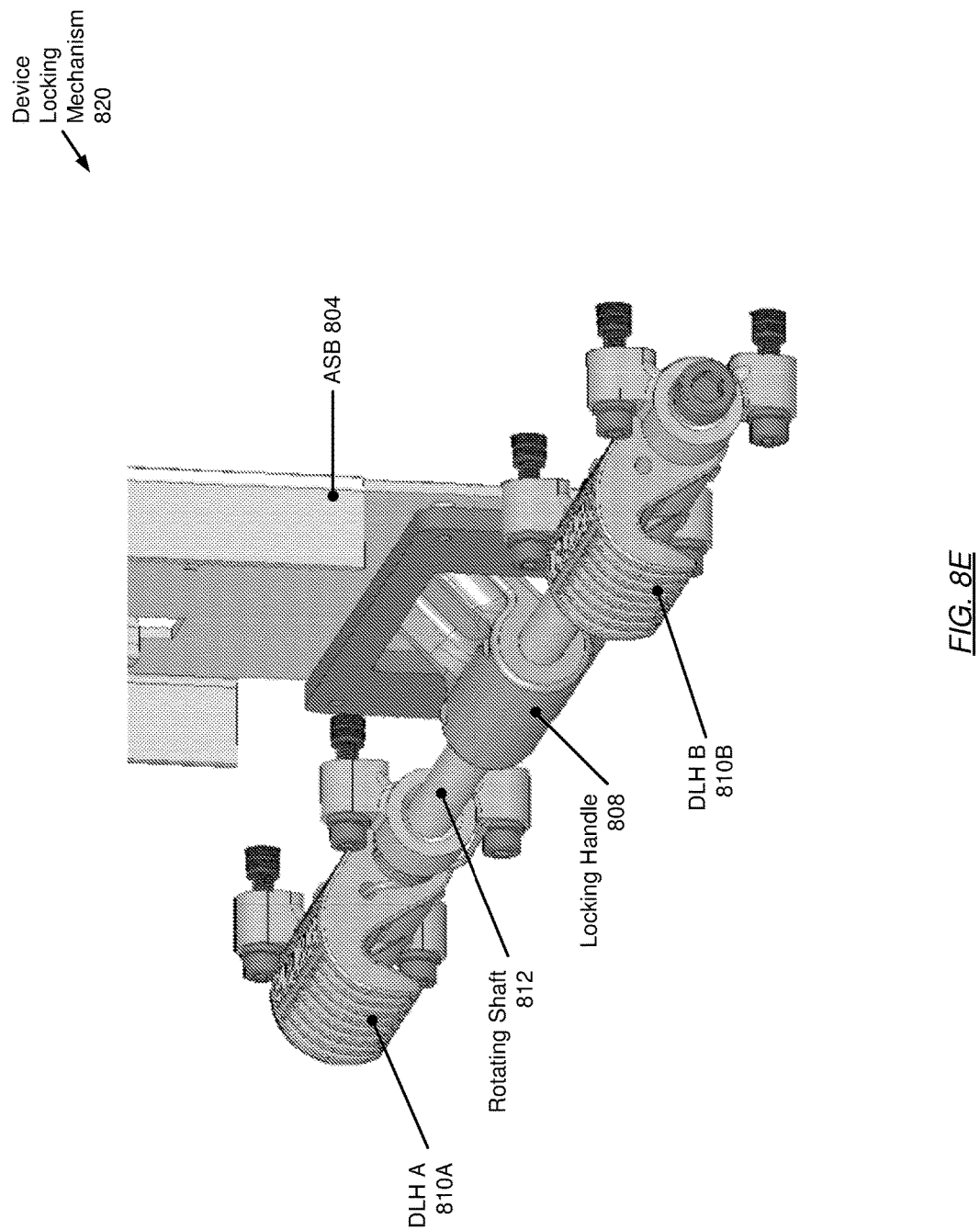
FIG. 8E shows a device locking mechanism in accordance with one or more embodiments of the invention.
Figure 8F:
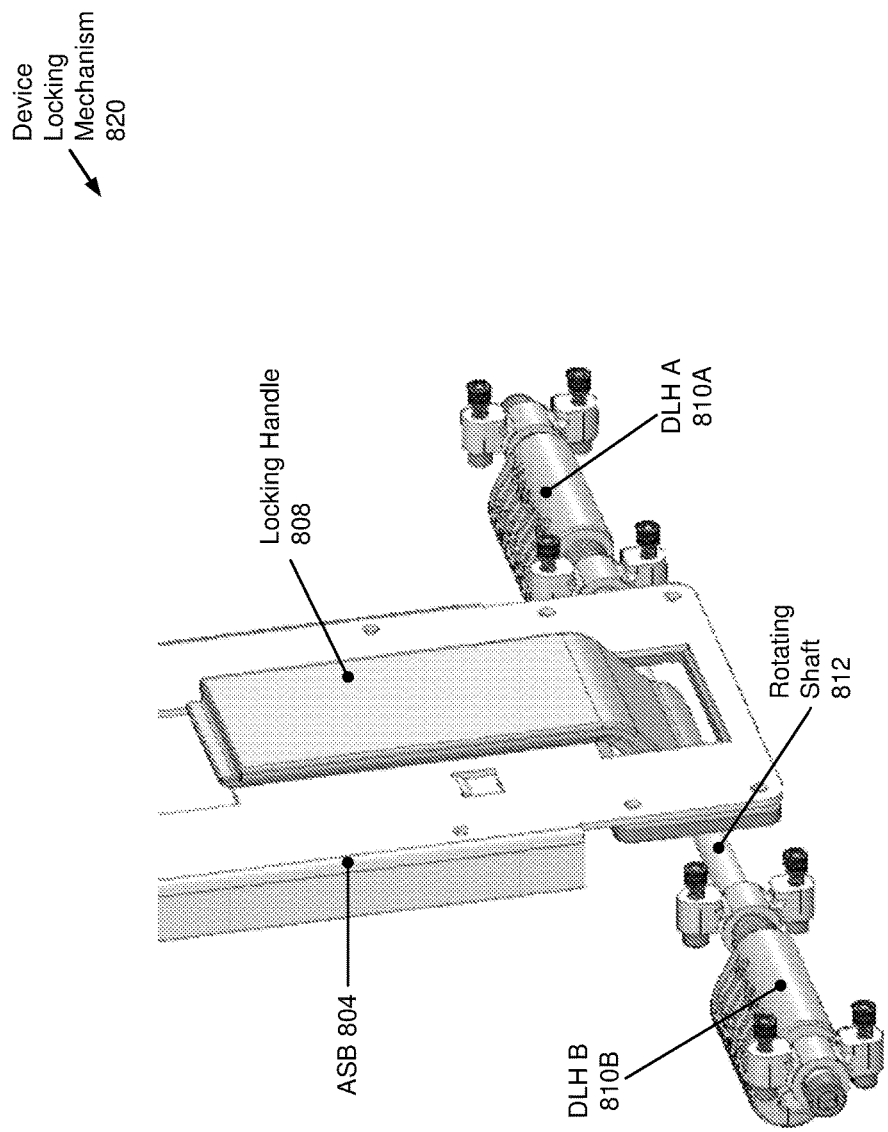
FIG. 8F shows a device locking mechanism in accordance with one or more embodiments of the invention.

FIGS. 8A and 8B show a vertical docking system (VDS) in accordance with one or more embodiments of the invention. The VDS (800) includes a vertical docking apparatus (VDA) (802) and a device locking apparatus (DLA) (806) operatively connected via an articulating support bracket (ASB) (804). As the VDA (802) has been substantively described above, each of the latter two components is described below.

In one or more embodiments of the invention, the device locking apparatus (DLA) (806) may be a physical device for securing an interactive device (not shown) onto an articulating vertical surface. The pair of device locking mounts (DLMs) (see e.g., FIGS. 1A and 3), as described thus far above, may in contrast, secure an interactive device onto a static vertical surface (e.g., a wall). In one or more embodiments of the invention, an articulating vertical surface may be, for example, the ASB (804) (discussed below). Though not particularly shown, the DLA (806) includes (similarly to a VDA) a back panel assembly oppositely disposed and operatively connected to a front panel assembly. When fastened together, the back panel assembly and the front panel assembly form a hollow manifold/structure within which additional components (see e.g., FIGS. 8C-8F) are housed and/or protected. The back panel assembly and the front panel assembly may be fastened together using two or more of any form of mechanical fastener (not shown) such as, for example, latches, magnets, clips, rivets, etc. In one or more embodiments of the invention, the DLA (806) includes a device locking mechanism, details of which are described below with respect to FIGS. 8C-8F.

In one or more embodiments of the invention, the articulating support bracket (ASB) (804) may be a physical, supportive assembly for operatively connecting the VDA (802) to the DLA (806). The ASB (804) may include further functionality to attach to a full-motion, articulating pivot (e.g., a stand coupler (see e.g., FIG. 8G)) extending from a stand structure (see e.g., FIG. 8G), thus enabling the ASB (804) (and subsequently, the VDA (802), the DLA (806), and an interactive device (not shown)) to move relative to the stand structure with various degrees of freedom. The full-motion, articulating pivot may attach to the ASB (804) at the stand coupler cavity (824). In one or more embodiments of the invention, using two or more of any form of mechanical fastener (e.g., latches, magnets, clips, rivets, screws, bolts, etc.), one end of the ASB (804) may be fastened to the backside (e.g., outside surface of the back panel) of the VDA (802). Further, using an additional two or more mechanical fasteners, the opposing end of the ASB (804) may be fastened to the backside (e.g., outside surface of the back panel) of the DLA (806). Similarly, the full-motion, articulating pivot may be attached to the ASB (804) at the stand coupler cavity (824) using two or more of any form of mechanical fastener exemplified above.

Turning to FIG. 8B, the VDS (800) further includes a locking handle (808) for engaging or disengaging the device locking mechanism housed within the DLA (806), thus securing or releasing the interactive device, respectively. In one or more embodiments of the invention, the locking handle (808) may translate up and down (sliding against the back of the ASB (804)), similar to a sliding latch, towards engaging and disengaging the device locking mechanism. In another embodiment of the invention, the locking handle (808) may pivot outwards away from the back of the ASB (804) and inwards until against the back of the ASB (804), similar to a lever, towards engaging and disengaging the device locking mechanism. The locking handle (808) may conform to other movements (through interaction by a user) to engage or disengage the device locking mechanism without departing from the scope of the invention.

FIGS. 8C-8F show varying perspectives of the device locking mechanism in accordance with one or more embodiments of the invention. The device locking mechanism, in one or more embodiments of the invention, may represent an assembly of components including at least a rotating shaft (812) operatively connected to the locking handle (808) and a pair of device locking hooks (DLHs) (810A, 810B) affixed/fastened to opposing ends of the rotating shaft (812). The locking handle (808) may be attached or fastened to the rotating shaft (812) in such a way so as to induce axial rotation of the rotating shaft (812) when the locking handle (808) is manipulated to engage or disengage the device locking mechanism. By way of an example, in acting similarly to a lever, the locking handle (808) may, in one or more embodiments of the invention, be directly coupled to the rotating shaft (812). Thus, in such an embodiment, the rotating shaft (812) may axially rotate in coordination with the pivoting of the locking handle (808). By way of another example, in acting similarly to a sliding latch, the locking handle (808) may, in another embodiment of the invention, be indirectly coupled to the rotating shaft (812). Thus, in such an embodiment, the locking handle (808) may be indirectly coupled to the rotating shaft (812) through, for example, a variation of the scotch yoke, or any other mechanism or device that converts the linear motion of the locking handle (808) into the rotational motion of the rotating shaft (812).

In one or more embodiments of the invention, the rotating shaft (812) may be solid or hollow, and constructed of any wear-resistant, high-strength material such as steel alloys, aluminum, titanium, carbon fiber, etc. The pair of DLHs (810A, 810B) may subsequently be constructed of similar materials as the rotating shaft (812). Further, as mentioned above, the pair of DLHs (810A, 810B) may be affixed to the rotating shaft (812) using one or more of any mechanical fastener each. In being affixed to the rotating shaft (812), the pair of DLHs (810A, 810B) also rotate axially in coordination with the rotating shaft (812). In one or more embodiments of the invention, the pair of DLHs (810A, 810B) couple and decouple from corresponding extrusions residing on the backside of an interactive device, similar to how the device docking hooks (DDHs) (see e.g., FIG. 1D) couple and decouple from other extrusions (e.g., docking hook extrusions) located elsewhere on the backside of the interactive device. In one or more embodiments of the invention, coupling and decoupling of the pair of DLHs (810A, 810B) coincide with the axial rotation of the rotating shaft (812) translated from the linear or pivoting motion of the locking handle (808). Moreover, in coupling with the aforementioned corresponding extrusions, the pair of DLHs (810A, 810B) effectively secure the interactive device onto the ASB (804), which exemplifies an articulating, vertical surface.

Figure 8G:
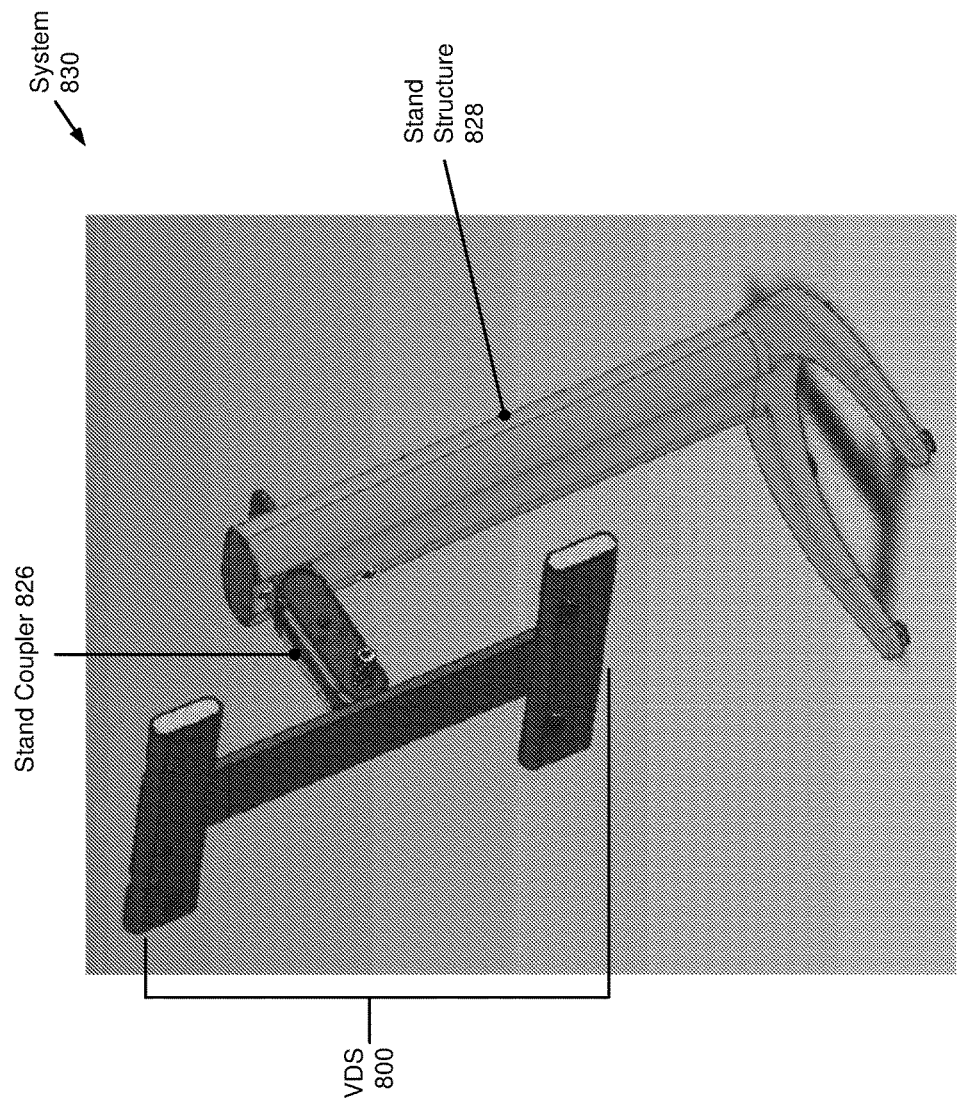
FIG. 8G shows a system in accordance with one or more embodiments of the invention.

FIG. 8G shows a system in accordance with one or more embodiments of the invention. The system (830) includes the VDS (800) (as portrayed in FIGS. 8A and 8B), a stand coupler (826), and a stand structure (828). As the VDS (800) is substantially described above, the stand coupler (826) and the stand structure (828) are described below.

In one or more embodiments of the invention, the stand coupler (826) may be a full-motion, articulating assembly coupling the VDS (800) to the stand structure (828). The stand coupler (826) may include functionality to enable the VDS (800) to move relative to the stand structure (828) with various degrees of freedom. In one or more embodiments of the invention, one end of the stand coupler (826) may attach to the VDS (800). More specifically, as mentioned above, one end of the stand coupler (826) may attach at a stand coupler cavity (see e.g., FIGS. 8A and 8B) situated at a midpoint of the length of the articulating support bracket (ASB). Subsequently, in one or more embodiments of the invention, the other end (e.g., oppositely disposed to the first aforementioned end) of the stand coupler (826) may attach to a vertical column portion (not shown) of the stand structure (826). Further, the stand coupler (826) may attach at varying heights along the length of the vertical column portion of the stand structure (826). In one or more embodiments of the invention, either end of the stand coupler (826) may be attached to the VDS (800) or stand structure (828) using one or more of any form of mechanical fastener, such as latches, magnets, clips, rivets, screws, bolts, etc.

In one or more embodiments of the invention, the stand structure (828) may be a fixture for mounting and supporting a VDS (800). The stand structure (828) may include a base portion (not shown) firming the stand structure (828), permanently or temporarily, to a horizontal surface (e.g., the floor). The stand structure (828) may further include a vertical column portion (not shown) affixed on top of the base portion and from which the stand coupler (826) attaches. The stand structure (828) may be constructed of any high-strength and durable materials that include, but are not limited to, metallic alloys, carbon fiber, woods, thermoplastics, fiber glass, etc., or any combination thereof.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system, comprising:
  a vertical docking apparatus (VDA), comprising:
    a back panel assembly, comprising:
      a first device docking hook (DDH);
      a second DDH;
      a first panel mounting cavity, located on a back surface of the back panel assembly, configured to allow the back panel assembly to be mounted to a vertical surface;
    a front panel assembly, attached to the back panel assembly, comprising:
      a first DDH cavity, adapted to receive the first DDH;
      a second DDH cavity, adapted to receive the second DDH; and
    a device locking mount (DLM), comprising:
      a first locking mounting cavity, located on a back surface of the DLM, configured to allow the DLM to be mounted to the vertical surface; and
      a fastening element, located on a front surface of the DLM; and
  an electronic device, comprising:
    a top portion, located on a back surface of the electronic device, comprising:
      a first docking hook extrusion, adapted to surround and make contact with the first DDH;
      a second docking hook extrusion, adapted to surround and make contact with the second DDH; and
    a bottom portion, vertically offset from the top portion, that contacts the fastening element when the first and second docking hook extrusions surround and make contact with the first and second DDHs, respectively.

2. The system of claim 1,
  wherein the DLM further comprises:
    a second locking mounting cavity, located on the back surface of the DLM, configured to allow the DLM to be mounted to the vertical surface.

3. The system of claim 2,
  wherein the DLM further comprises:
    a third locking mounting cavity, located on the back surface of the DLM, configured to allow the DLM to be mounted to the vertical surface.

4. The system of claim 1,
  wherein the fastening element is a magnet.

5. The system of claim 1, wherein the bottom portion further comprises:
  a locking mount extrusion adapted to surround the fastening element.

6. The system of claim 1,
  wherein when the bottom portion is in contact with the fastening element, the back surface of the device is parallel to the vertical surface.

7. The system of claim 1,
  wherein the DLM is placed directly below at least one selected from the group consisting of the first and second DDH.

* * * * *